(12) United States Patent
Sulibhavi et al.

(10) Patent No.: US 11,765,230 B2
(45) Date of Patent: Sep. 19, 2023

(54) ARTIFICIAL INTELLIGENCE (AI) BASED MANAGEMENT OF DISTRIBUTED LEDGER TECHNOLOGY (DLT) NETWORK FOR INTERNET OF THINGS (IOT)

(71) Applicant: SONY GROUP CORPORATION, Tokyo (JP)

(72) Inventors: Madhvesh Sulibhavi, Bangalore (IN); Pratika Maheshwari, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/548,099

(22) Filed: Dec. 10, 2021

(65) Prior Publication Data

US 2023/0188600 A1 Jun. 15, 2023

(51) Int. Cl.
*H04L 67/12* (2022.01)
*G16Y 40/35* (2020.01)
*G06F 18/214* (2023.01)

(52) U.S. Cl.
CPC ............ *H04L 67/12* (2013.01); *G06F 18/214* (2023.01); *G16Y 40/35* (2020.01)

(58) Field of Classification Search
None
See application file for complete search history.

(56) References Cited

U.S. PATENT DOCUMENTS

| | | | | |
|---|---|---|---|---|
| 11,526,875 B1* | 12/2022 | Shetti | ...................... | G06Q 40/04 |
| 2017/0206604 A1* | 7/2017 | Al-Masoud | ............ | G06Q 40/08 |
| 2017/0287090 A1* | 10/2017 | Hunn | ...................... | G06Q 50/18 |
| 2018/0302222 A1 | 10/2018 | Agrawal et al. | | |
| 2020/0184556 A1 | 6/2020 | Cella | | |
| 2021/0004794 A1* | 1/2021 | Kumar Kumaresan | ...................... | G06Q 30/0645 |
| 2021/0272134 A1* | 9/2021 | Indani | .................. | G06Q 10/101 |
| 2022/0158818 A1* | 5/2022 | Jiang | ...................... | H04L 9/0618 |
| 2022/0222134 A1* | 7/2022 | Lai | ........................ | G06F 11/142 |
| 2023/0038529 A1* | 2/2023 | Gutta | .................... | G06F 40/279 |

FOREIGN PATENT DOCUMENTS

| | | | |
|---|---|---|---|
| CN | 111353783 A | 6/2020 | |
| CN | 112967775 A | 6/2021 | |
| EP | 3596880 A4 | 3/2020 | |
| GB | 2582421 A * | 9/2020 | ......... G05B 19/4185 |
| WO | 2020/018589 A1 | 1/2020 | |

* cited by examiner

*Primary Examiner* — Chris Parry
*Assistant Examiner* — Abderrahmen Chouat
(74) *Attorney, Agent, or Firm* — CHIP LAW GROUP

(57) ABSTRACT

A system and method for management of a distributed ledger technology (DLT) network are provided. The system receives a first request from an edge device to communicate with an operator entity in the DLT network. The system determines a plurality of parameters associated with the edge device, based on a type of the edge device. The system applies an artificial intelligence model on the plurality of parameters to generate a smart contract for communication between the edge device and the operator entity. The system controls execution of a code associated with the smart contract to create a transaction record on the DLT network, based on the communication between the edge device and the operator entity. The system temporarily suspends the code associated with the smart contract in the DLT network based on a second request from one of the edge device or the DLT network.

20 Claims, 22 Drawing Sheets

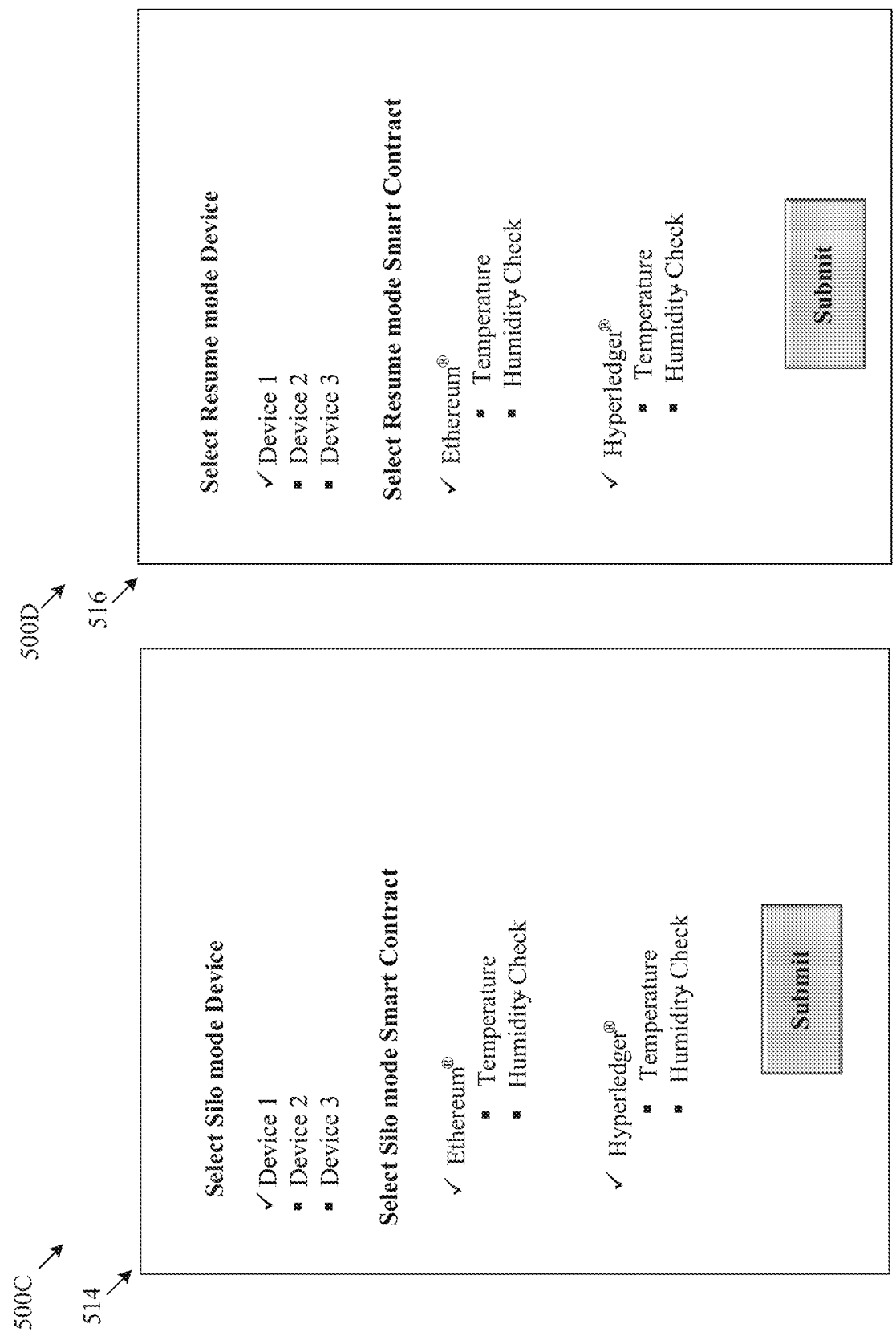

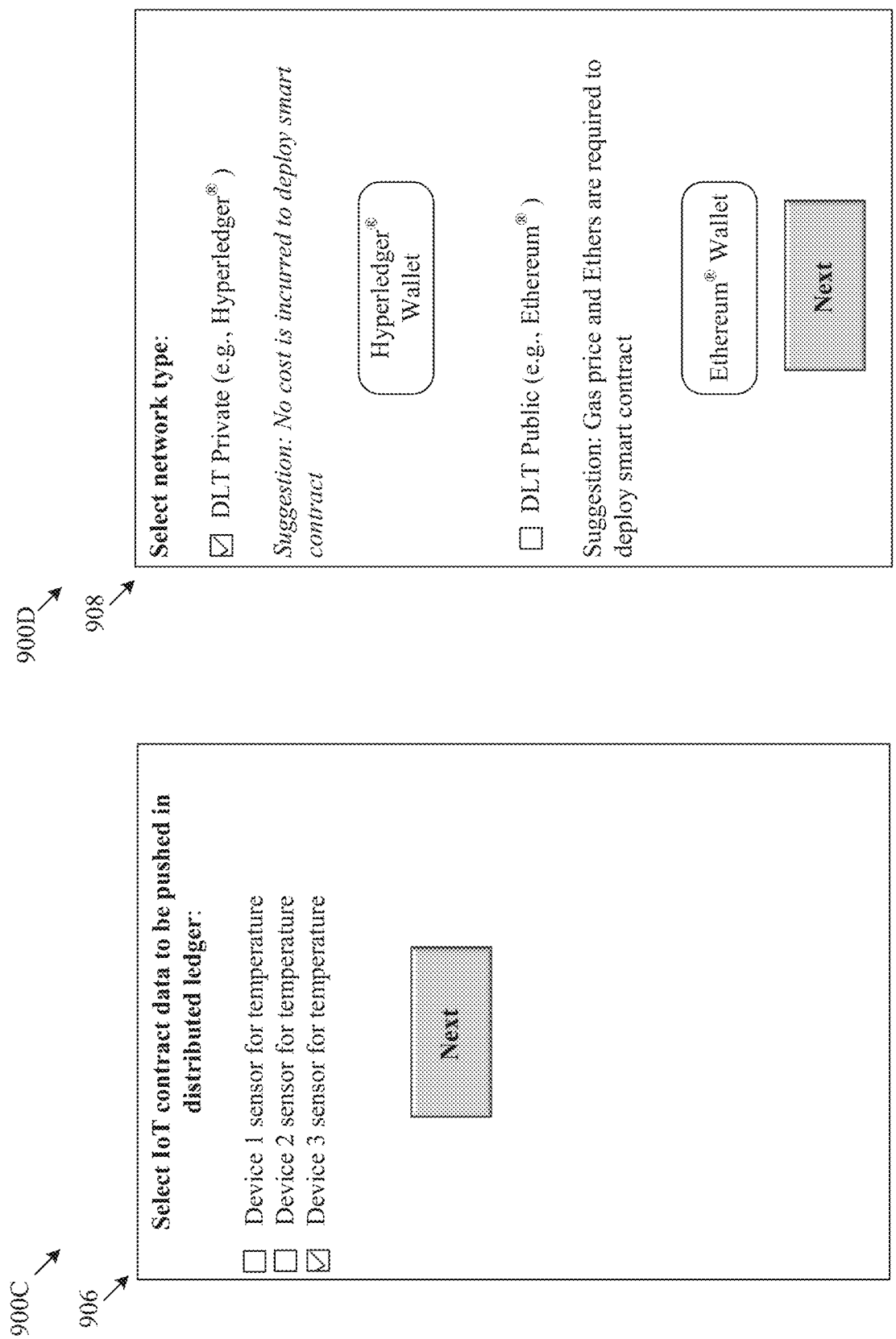

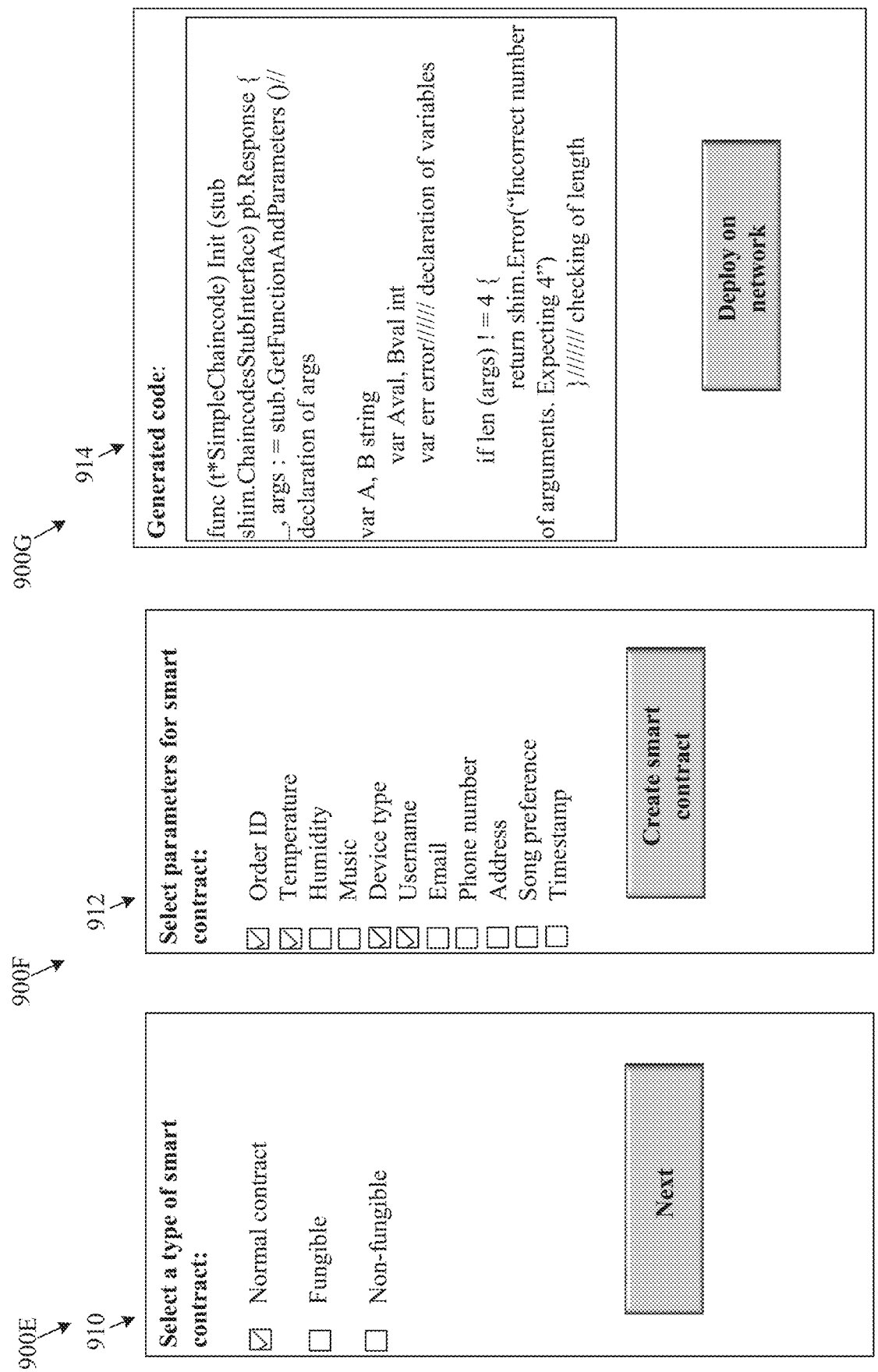

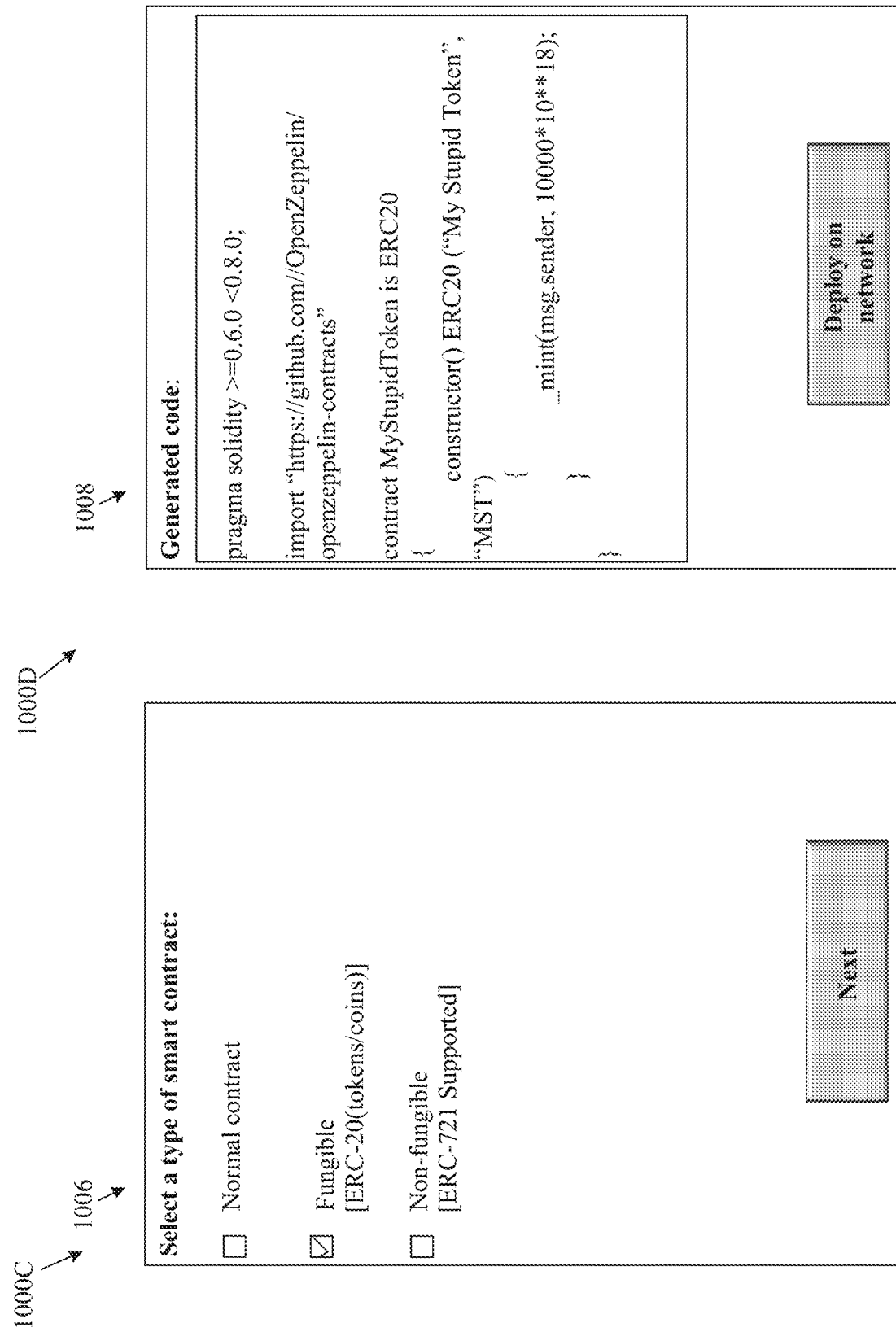

Shopping Mall Normal Blockchain Case

Where to deploy?  12.13.98.101

Select Platform  Ethereum®

Select Use Case  Medical

Choose functions for the contract
- ☑ Get Function
- ☑ Post Function
- ☐ Payable Function
- ☐ Put Function Create Contract

- Select device to fetch data
  - ✓ Device 1
  - • Device 2

- Enter values to be pushed into Blockchain and upload file to Decentralized Web for access data Order Id: 1
  Username: ABC
  Date: 28/10/2021

- Select file to be pushed into Decentralized Web

1.Choose file | No file chosen | 2.Send to Decentralized Web

Submit 1400
1402

FIG. 14

ARTIFICIAL INTELLIGENCE (AI) BASED MANAGEMENT OF DISTRIBUTED LEDGER TECHNOLOGY (DLT) NETWORK FOR INTERNET OF THINGS (IOT)

CROSS-REFERENCE TO RELATED APPLICATIONS/INCORPORATION BY REFERENCE

None.

FIELD

Various embodiments of the disclosure relate to Internet of Things (I) and distributed ledger technology (DLT). More specifically, various embodiments of the disclosure relate to a system and method for management of DLT networks for IoT based on artificial intelligence (AI).

BACKGROUND

Advancements in the field of distributed ledger technology (DLT) have led to the development of various use case scenarios for management of certain services and business operations. A DLT network may be utilized by operators for managing their services and/or operations. The DLT network may include different types of DLTs, such as Blockchain, Hyperledger®, Ethereum®, and so forth. More and more operators may prefer to run their operations based on smart contracts using the DLT network, because the DLT network ensures a secure communication between the operators and customer devices. However, a number of operators may be not yet familiar with the upcoming technologies and developments in the DLT technology. Testing and deployment of smart contracts for managing their operations may be a cumbersome and time consuming task for the operators. Currently, there is no platform that intelligently creates IoT based smart contracts for operators that best suits the use case scenarios, provides interoperability for different types of IoT devices and DLT networks, and provides features that optimizes resources for the management of the DLT network, and controls cost for the operators.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for artificial intelligence (AI) based management of distributed ledger technology (DLT) networks for Internet of Things (IOT) is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 5B-5D are diagrams that collectively illustrate user interfaces for interoperability of smart contract across different types of DLT networks and different types of IoT devices with silo and resume modes, in accordance with an embodiment of the disclosure.

FIGS. 9A-9G are diagrams that collectively illustrate user interfaces for generation of a smart contract in a DLT network, in accordance with an embodiment of the disclosure.

FIGS. 10A-10D are diagrams that collectively illustrate user interfaces for generation of a smart contract in a DLT network with support for fungible and non-fungible tokens (NFTs), in accordance with an embodiment of the disclosure.

FIG. 14 is a diagram that illustrates a user interface for generation of a normal smart contract for a specific use case, in accordance with an embodiment of the disclosure.

DETAILED DESCRIPTION

Figure 1:
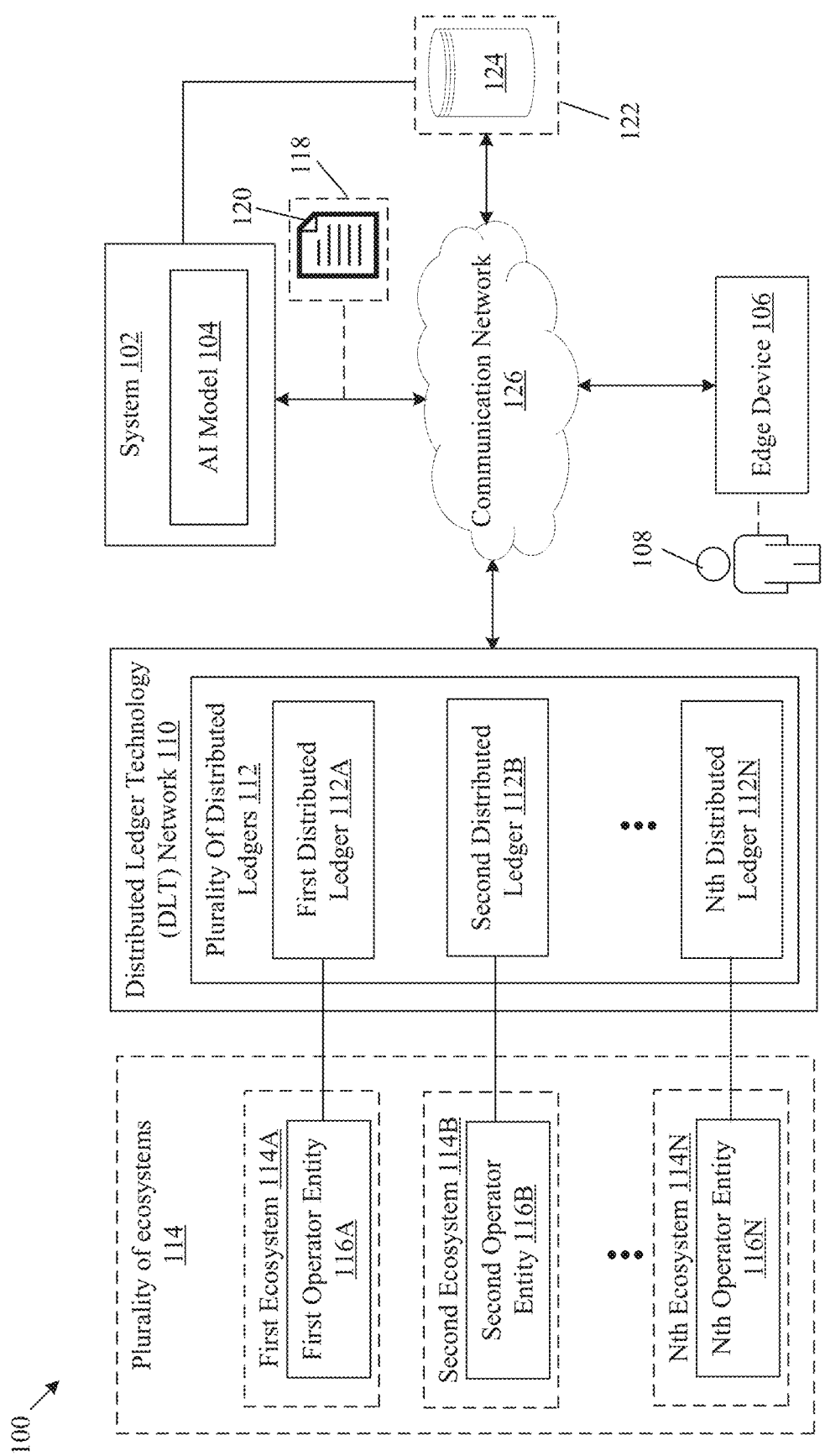
FIG. 1 is a diagram of an exemplary network environment for management of a distributed ledger technology (DLT) network using an artificial intelligence (AI) model, in accordance with an embodiment of the disclosure.

The following described implementations may be found in the disclosed system and method for management of distributed ledger technology (DLT) networks for Internet of Things (I) using an artificial intelligence (AI) model. The system may be configured to receive a first request from an edge device associated with a user to communicate with an operator entity in the DLT network. For example, the edge device may be an IoT device, such as, a smartwatch associated with the user (such as a customer) or a smart sensor. In an example, the operator entity may be associated with different ecosystems, such as, a Mobility as a Service (MaaS) system, a medical facility, or a consumer retail establishment (for example, a shopping mall). In an embodiment, the DLT network may be one of a permissionless DLT network, a permissioned DLT network, or a hybrid DLT network. The system may be configured to determine a plurality of parameters associated with the edge device and the DLT network. For example, the plurality of parameters may include at least one of sensor data associated with the edge device, user-specific data associated with the user, data associated with specifications of the edge device, or data related to a type of the DLT network.

The system may output, by the AI model, one or more suggestions for selection of a type of the DLT network for the generation of the smart contract based on cost or other factors. The system may receive, based on the one or more suggestions, a selection of the type of the DLT network for the generation of the smart contract. The system may apply the AI model on the determined plurality of parameters to generate the smart contract for communication between the edge device and the operator entity in the DLT network. The AI model may be trained for the generation of the smart contract. The system may thereby automatically generate the smart contract, which best suits the use case scenario and ecosystem of the operator entity, based on the type of the edge device and the selected type of the DLT network. For example, the use case scenario may include mobility service, medical facility, consumer retail establishment, and so on. In some embodiments, the smart contract may be at least one of a non-fungible token (NFT) enabled smart contract, a fungible token enabled smart contract, or a non-NFT based normal smart contract based on the requirements of the user, the operator entity, or the system.

The system may further control execution of a code (for example, a chaincode) associated with the smart contract to create a transaction record on the DLT network. The creation of the transaction record may be based on the communication between the edge device and the operator entity. The system may be configured to temporarily suspend the code associated with the smart contract in the DLT network based on a second request from one of the edge device or the DLT network. In an embodiment, the system may be configured to receive the second request for suspension of the smart contract in the DLT network from the edge device, based on deactivation of a functionality of the edge device. In response to the second request, the system may perform a first set of operations to initiate a silo mode for the edge device based on a type of the DLT network. The silo mode may correspond to the suspension of the communication with the DLT network. In an embodiment, the system may receive the second request for suspension of the smart contract in the DLT network from the DLT network, based on usage of the DLT network. In response to the second request, the system may perform a second set of operations based on a type of the DLT network to initiate a silo mode for DLT network. The silo mode may correspond to the suspension of the smart contract on the DLT network. The system may initiate the silo mode for the edge device and/or the DLT network, to thereby optimize resource utilization (for example, memory space utilization) for the management of the DLT network by offloading the transaction record and data associated with the edge device to a local database in the silo mode. The system may further enable the operator entity to control costs by temporarily suspending the chaincode associated with the smart contract in the silo mode based on deactivation of the functionality of the edge device or based on the usage of the DLT network.

In an embodiment, the system may further receive a third request for resuming an operation of the smart contract in the DLT network. The third request may be received based on a reactivation of a functionality of the edge device. In response to the third request, the system may perform a third set of operations based on a type of the DLT network to initiate a resume mode for the edge device and/or the DLT network.

The system of the present disclosure may provide a unified platform for generation of smart contracts that best suits different ecosystems and use case scenarios, in an easy-to-use yet intelligent manner. The system may further initiate the silo mode and the resume mode, according to the requirements of the user (for example, the customer or the operator entity), to thereby provide a cost-effective solution for smart contract generation.

FIG. 1 is a diagram of an exemplary network environment for management of a distributed ledger technology (DLT) network using an artificial intelligence (AI) model, in accordance with an embodiment of the disclosure. With reference to FIG. 1, there is shown a block diagram of a network environment 100. In the network environment 100, there is shown a system 102 that may include an AI model 104. In the network environment 100, there are further shown an edge device 106 associated with a user 108 and a DLT network 110. The DLT network 110 may include a plurality of distributed ledgers 112, such a first distributed ledger 112A, a second distributed ledger 112B, up to an Nth distributed ledger 112N. In the network environment 100, there is further shown a plurality of ecosystems 114. The plurality of ecosystems 114 may include a first ecosystem 114A that may be associated with a first operator entity 116A, a second ecosystem 114B that may be associated with a second operator entity 116B, and an Nth ecosystem 114N that may be associated with an Nth operator entity 116N. The first operator entity 116A may be associated with the first distributed ledger 112A, the second operator entity 116B may be associated with the second distributed ledger 112B, and the Nth operator entity 116N may be associated with the Nth distributed ledger 112N. In the network environment 100, there is further shown a frontend 118 of the system 102 that may serve as an interface to generate a smart contract 120 on the DLT network 110. In the network environment 100, there is further shown a backend 122 associated with the system 102, and a database 124 at the backend 122 of the system 102. Further, the network environment 100 may further include a communication network 126 through which the system 102, the DLT network 110, and the edge device 106 may communicate with each other.

The system 102 may include suitable logic, circuitry, and interfaces that may be configured to generate the smart contract 120 using the AI model 104, and to establish communication between the edge device 106 and the operator entity (such as the first operator entity 116A) based on the generated smart contract 120. The system 102 may be further configured to temporarily suspend the code associated with the generated smart contract 120 in the DLT network 110. The system 102 may be associated with the backend 122 that includes one or more databases (such as the database 124) for storing offloaded data from the DLT network 110. The system 102 may be associated with the frontend 118 that may serve as a user interface to generate and deploy the smart contract 120 on the DLT network 110. Examples of the system 102 may include, but are not limited to, a computing device, a mainframe machine, a server, a database server, a cloud server, an application server, a computer workstation, and/or an information processing device.

The AI model 104 may be a regression model which may be trained to identify a relationship between inputs, such as features in a training dataset and output labels. The AI model 104 may be defined by its hyper-parameters, for example, number of weights, cost function, input size, number of layers, and the like. The hyper-parameters of the AI model 104 may be tuned and weights may be updated to move towards a global minima of a cost function for the AI model 104. After several epochs of the training on the feature information in the training dataset, the AI model 104 may be trained to output a prediction result for a set of inputs. The prediction result may be indicative of a class label for each input of the set of inputs. For example, the AI model 104 may be trained to predict portions of the device code and the smart contract 120, based on the plurality of parameters as the input.

The plurality of layers of the AI model 104 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the AI model 104. Outputs of each hidden layer may be coupled to inputs of at least one node in other layers of the AI model 104. Node(s) in the final layer may receive inputs from at least one hidden layer to output a result. The number of layers and the number of nodes in each layer may be determined from hyper-parameters of the AI model 104. Such hyper-parameters may be set before, while training, or after training the AI model 104 on a training dataset.

Each node of the AI model 104 may correspond to a mathematical function (e.g. a sigmoid function or a rectified linear unit) with a set of parameters, tunable during training of the AI model 104. The set of parameters may include, for example, a weight parameter, a regularization parameter, and the like. Each node may use the mathematical function to compute an output based on one or more inputs from nodes in other layer(s) (e.g. previous layer(s)) of the AI model 104. All or some of the nodes of the AI model 104 may correspond to the same or a different mathematical function.

In accordance with an embodiment, the system 102 may train the AI model 104 on a training dataset that includes a first set of parameters, such as, sensor data associated with the edge device 106, user-specific data associated with the user 108, data associated with specifications of the edge device 106, and data related to a type of the DLT network 110. The AI model 104 may be trained on a second set of parameters to generate the code (for example, chaincode) associated with the smart contract. For example, the system 102 may input the training dataset to train the AI model 104. Details of the training of the AI model 104 are further described, for example, in FIGS. 8A and 8B.

In training the AI model 104, one or more parameters of each node of the AI model 104 may be updated based on whether an output of the final layer for a given input (from the training dataset) matches a correct result based on a loss function for the AI model 104. The above process may be repeated for the same or a different input until a minima of loss function may be achieved, and a training error may be minimized. Several methods for training are known in art, for example, gradient descent, stochastic gradient descent, batch gradient descent, gradient boost, meta-heuristics, and the like.

The AI model 104 may include electronic data, which may be implemented as, for example, a software component of an application executable on the system 102. The AI model 104 may rely on libraries, external scripts, or other logic/instructions for execution by a processing device, such as the system 102. The AI model 104 may include code and routines configured to enable a computing device, such as the system 102 to perform one or more operations, such as the generation of the smart contract 120. Additionally or alternatively, the AI model 104 may be implemented using hardware including a processor, a microprocessor (e.g., to perform or control performance of one or more operations), a field-programmable gate array (FPGA), or an application-specific integrated circuit (ASIC). Alternatively, in some embodiments, the ML model may be implemented using a combination of hardware and software.

In some embodiments, the AI model 104 may be a neural network model. Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the learning engine may include numerical computation techniques using data flow graphs. In certain embodiments, the AI model 104 may be based on a hybrid architecture of multiple Deep Neural Networks (DNNs).

The edge device 106 may include suitable logic, circuitry, and interfaces that may be configured to transmit a first request to the system 102 to communicate with the operator entity (such as the first operator entity 116A) based on the smart contract 120, and a second request to temporarily suspend the code associated with the smart contract 120. In an embodiment, the edge device 106 may be an Internet-of-Things (I) device. Examples of the edge device 106 may include, but are not limited to, a smartphone, a smartwatch, a smart sensor, an image sensor, an event camera, a display device, an aroma dispenser, an electronic furniture, a lighting device, a sound reproduction device, an electronic curtain, an electronic toy, an electronic wind-chime, an electronic vase, a digital photo-frame, or other IoT devices. Each ecosystem of the plurality of ecosystems 114 may be associated with a different type of edge device 106. For example, a medical facility may be associated with a smart sensor or a camera as the edge device 106, a MaaS system may be associated with a smartphone as the edge device 106, and the consumer retail establishment may be associated with a smart watch as the edge device 106. In an embodiment, the edge device 106 may be located within the ecosystem of the operator entity (such as the medical facility). In another embodiment, the edge device 106 may be located outside the ecosystem of the operator entity (such as the MaaS system).

The DLT network 110 may include the plurality of distributed ledgers 112. The first distributed ledger 112A, the second distributed ledger 112B, and the Nth distributed ledger 112N may each include a plurality of nodes. Each node may store transaction records associated with the operator entity (such as the MaaS system, the medical facility, or the consumer retail establishment). The transaction records may be included in a set of state objects, such as an initial state object and an updated version of the initial state object. In some embodiments, the plurality of distributed ledgers 112 may be decentralized and distributed database systems, which may maintain an immutable record of data operations or transactions. A set of data operations may be grouped together as a block and may be further linked to a previous block of data operations to form a chain of blocks. All blocks of data operations may be stored in a decentralized manner, whereby at least two participants or nodes of each DLT of the plurality of distributed ledgers 112 may store a subset of blocks associated with one or more transactions in which the at least two participants or nodes may participate. Further, the plurality of distributed ledgers 112 may include an operating system (for example, a Java Virtual Machine (JVM)) which may allow for deployment of the smart contract 120 between multiple parties, for example, the edge device 106 and the operator entity. By way of example, and not limitation, the plurality of distributed ledgers 112 may be Corda® blockchain, an Ethereum® blockchain, or a Hyperledger® blockchain.

The plurality of distributed ledgers 112 may use secure cryptographic hashes to identify parties and data, and also to link a state object to a previous version of the state object to further provide a chain of provenance. A transaction between a group of parties may be stored (as an associated transaction record) on the respective distributed ledgers (such as the first distributed ledger 112A, the second distributed ledger 112B and the Nth distributed ledger 112N) such that only the group of parties associated with the transaction may be able to view the transaction. A party associated with a transaction may store a current state object of the transaction in a vault (i.e. a database associated with a respective distributed ledger). Another party eligible to view or process the transaction (e.g., validate the transaction) may retrieve the current state object of the transaction from the vault. Additionally, each state object of the respective distributed ledgers may include the smart contract 120 between the parties or nodes that may participate in an associated transaction.

Each of the plurality of distributed ledgers 112 may update a transaction by updating state properties of an input state object to produce an output state object. The updated transaction may thereby create a chain of provenance which may be associated with the transaction data. Each of the plurality of distributed ledgers 112 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a uniqueness of the updated transaction may be determined based on a check that there exists no other transaction that has reached a consensus by use of the same input state object as the current transaction.

In accordance with an embodiment, each of the plurality of distributed ledgers 112 may be associated with a decentralized application that may include a client-side interface (the frontend 118) and a server-side interface (such as the backend 122). The decentralized application may be configured to implement a workflow (e.g., a Corda® workflow, Hyperledger® workflow, or Ethereum® workflow, etc.) to record a transaction (and thereby store an associated transaction record) on a node of the respective DLT of the plurality of DLTs 112.

Each ecosystem of the plurality of ecosystems 114 may be associated with a specific use case scenario, such as the MaaS system, the medical facility, or the consumer retail establishment. Each operator entity (such as the first operator entity 116A, the second operator entity 116B, and the Nth operator entity 116N) may include suitable logic, circuitry, and interfaces that may be configured to communicate with the edge device 106 and the DLT network 110. The operator entity (such as the first operator entity 116A, the second operator entity 116B, and the Nth operator entity 116N) may be configured to host one or more services or one or more products, and may provide web-based or application-based user interfaces for access to the hosted services by users. The operator entity (such as the first operator entity 116A, the second operator entity 116B, and the Nth operator entity 116N) may utilize the DLT network 110 for connecting with different edge devices (for example, the edge device 106), creating one or more transactions with the users of the edge devices, and validating the transactions. Examples of the operator entity may include, but are not limited to, a computing device, a mainframe machine, a server, a computer workstation, an application server, a cloud server, and/or an information processing device.

The smart contract 120 may include a set of conditions under which multiple parties (for example, the edge device 106 and the first operator entity 116A) to the smart contract 120 may agree to interact with each other. The smart contract 120 may run on one or more nodes of the plurality of distributed ledgers 112 and may govern transitions between state objects to generate a transaction. The smart contract 120 may be generated once, reused for a large numbers of state objects, and may refer to a governing legal prose by way of cryptographic hashes. In some embodiments, the smart contract 120 may be at least one of a non-fungible token (NFT) enabled smart contract that supports NFTs in accordance with ERC-720 standard, a fungible token enabled smart contract that supports fungible tokens in accordance with ERC-20 standard, or a non-NFT based normal smart contract based on the requirements of the user 108, the operator entity (such as the first operator entity 116A), or the system 102. The NFT enabled smart contract may support asset ownership and transfer of ownership linked to IoT devices.

The database 124 may include suitable logic, circuitry, code, and/or interfaces that may be configured to store offloaded transaction records and data associated with the edge device 106 in a case where the silo mode is initiated. In a case where the resume mode is initiated, the system 102 may access the database 124 to retrieve the offloaded transaction records and data. In accordance with another embodiment, the database 124 may be a non-distributed ledger (or a local) node. In some embodiments, the database 124 may be a document database that may store the transaction records in a JSON (JavaScript object notation) format.

The communication network 126 may include a communication medium through which the system 102, the DLT network 110, and the edge device 106 may communicate with each other. The communication network 126 may be one of a wired connection or a wireless connection. Examples of the communication network 126 may include, but are not limited to, the Internet, a cloud network, Cellular or Wireless Mobile Network (such as Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 126 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the operator entity (for example, the first operator entity 116A, the second operator entity 116B, or the Nth operator entity 116N) may host one or more services to the user 108 on a respective ecosystem of the plurality of ecosystems 114. The plurality of ecosystems 114 may utilize the DLT network 110 to transact with the user 108. For example, the first ecosystem 114A may be associated with the MaaS system. The MaaS system may use the first distributed ledger 112A, for example, Ethereum® to store the transaction records associated with the MaaS system. The MaaS system may provide travel services from one place to another by the fastest route using one or more operator entities. The second ecosystem 114B may be associated with, for example, a medical facility (such as a hospital). The medical facility may use the second distributed ledger 112B, for example, a Hyperledger® to store the transaction records associated with the medical facility. The medical facility may provide, for example, for a medical consultation or a medical treatment along with monitoring of biological information (such as blood pressure, pulse rate, temperature, etc.). The Nth ecosystem 114N may be associated with, for example, a consumer retail establishment (such as a shopping mall). The consumer retail establishment may use the Nth distributed ledger 112N, for example, the Hyperledger® to store the transaction records associated with the consumer retail establishment. The consumer retail establishment may provide retail services along with reward points for purchases.

The edge device 106 associated with the user 108 may be the IoT device. In an exemplary scenario, the MaaS system may be utilized by the user 108 for booking a transport service. The system 102 may receive the first request from the edge device 106 associated with the user 108 to communicate with the operator entity, such as the first operator entity 116A. The system 102 may output, by the AI model 104, one or more suggestions for selection of a type of the DLT network 110 for the generation of the smart contract 120 based on cost or other factors. The system 102 may receive, based on the one or more suggestions, a selection of the type of the DLT network 110 for the generation of the smart contract 120. The system 102 may determine the plurality of parameters associated with the edge device 106 and the DLT network 110, based on a type of the edge device 106 and the selected type of the DLT network 110. In some embodiments, the plurality of parameters may include at least one of sensor data associated with the edge device 106, user-specific data associated with the user 108, data associated with specifications of the edge device 106, or data related to a type of the DLT network 110. Details of the determination of the plurality of parameters are further described, for example in FIG. 3.

The system 102 may apply the AI model 104 on the determined plurality of parameters to generate the smart contract 120 for communication between the edge device 106 and the operator entity, such as the first operator entity 116A in the DLT network 110. The AI model 104 may be trained on the generation of the smart contract 120. The smart contract 120 may include rules required for a secure communication between the edge device 106 and the operator entity. In an embodiment, the smart contract 120 may be at least one of a non-fungible token (NFT) enabled smart contract, a fungible token enabled smart contract, or a non-NFT based normal smart contract based on the requirements of the user 108, the operator entity (such as the first operator entity 116A), or the system 102.

In accordance with an embodiment, the system 102 may receive a set of parameters of the plurality of parameters from the edge device 106. The system 102 may generate a device code (such as an IoT device code) associated with the edge device 106 based on the application of the AI model 104 on the received set of parameters. The system 102 may generate the smart contract 120 based on the generated device code. Details of the generation of the smart contract 120 are further described, for example, in FIG. 3. The system 102 may thereby automatically generate the smart contract 120, which best suits the use case scenario (for example, mobility service) based on the type of the edge device and the selected type of the DLT network.

The system 102 may further control execution of a code associated with the smart contract 120 to create a transaction record on the DLT network 110. The creation of the transaction record may be based on the communication between the edge device 106 and the operator entity. For example, the transaction record may be associated with the booking of the transport service by the user 108 using the MaaS system. Details of the communication between the edge device 106 and the operator entity are further described, for example in FIG. 3.

In an embodiment, the system 102 may receive a second request from one of the edge device 106 or the DLT network 110. Based on the received second request, the system 102 may temporarily suspend the code associated with the smart contract 120 in the DLT network 110. Details of the temporary suspension of the code are further described, for example in FIG. 3. In an embodiment, the system 102 may be configured to receive the second request for suspension of the smart contract 120 in the DLT network 110 from the edge device 106. The second request may be received based on deactivation of a functionality of the edge device 106. The system 102 may perform, in response to the second request, a first set of operations to initiate a silo mode for the edge device 106 based on the type of the DLT network 110. The silo mode may correspond to the suspension of the communication with the DLT network 110. In an embodiment, the system 102 may receive the second request for suspension of the smart contract in the DLT network 110 from the DLT network 110, based on usage of the DLT network 110. In response to the second request, the system 102 may perform a second set of operations based on a type of the DLT network 110 to initiate a silo mode for DLT network 110. The silo mode may correspond to the suspension of the smart contract 120 on the DLT network 110. The system 102 may initiate the silo mode for the edge device 106 and/or the DLT network 110, to thereby optimize resource utilization (for example, memory space utilization) for the management of the DLT network 110 by offloading the transaction record and data associated with the edge device 106 to the database 124 in the silo mode. The system 102 may further enable the operator entity to control costs by temporarily suspending the chaincode associated with the smart contract 120 in the silo mode based on deactivation of the functionality of the edge device 106 or based on the usage of the DLT network 110.

In an embodiment, the system 102 may be configured to receive a third request for resuming an operation of the smart contract 120 in the DLT network 110. The third request may be received based on a reactivation of the functionality of the edge device 106. The system 102 may perform, in response to the third request, a third set of operations based on the type of the DLT network 110 to initiate a resume mode for the edge device 106 and/or the DLT network 110. In some embodiments, the third set of operations may include restart of the suspended code associated with the smart contract 120 on the DLT network 110 based on the type of the DLT network 110 and the transaction record, or redeployment of the code associated with the smart contract 120 on the DLT network 110 based on the determined plurality of parameters and the type of the DLT network 110. Details of the initiation of the silo mode and the resume mode for the DLT network 110 are further described, for example in FIGS. 5A-5D.

In accordance with an embodiment, the DLT network 110 may include a plurality of DLT platforms and a notary node. The system 102 may be further configured to identify an unauthorized transaction between one or more DLT platforms of the plurality of DLT platforms and the edge device 106 using the notary node. Details of the usage of the notary node are further described, for example in FIG. 6.

In accordance with an embodiment, the system 102 may be further configured to connect with a plurality of operator entities associated with a plurality of ecosystems 114 based on user input for interoperability between DLT networks. The plurality of operator entities may include a first operator entity associated with a first (source) DLT network and a second operator entity associated with a second (target) DLT network. The system 102 may transition from the first DLT network to the second DLT network based on the connection and the interoperability of the system 102. Details of the interoperability between the plurality of DLT platforms are further described, for example in FIGS. 5B-5D and 6.

In accordance with an embodiment, the system 102 may be further configured to detect a change in a pattern of the communication between the edge device 106 and the operator entity in the DLT network 110. The detection of the change in pattern may be based on one of a change in a location of one of the edge device 106 or the operator entity in the DLT network 110, or an unauthorized access to the DLT network 110. In some embodiments, the system 102 may deactivate the smart contract 120, in a case where the change in the pattern is based on the change in the location of one of the edge device 106 or the operator entity. In one or more embodiments, the system 102 may determine the edge device 106 as a faulty edge device, in a case where the change in the pattern is based on the unauthorized access to the DLT network 110. Details of the detection of change in the pattern of the communication are further described, for example in FIG. 7.

The system 102 may thereby provide a unified platform for generation of the smart contract 120 that best suits each ecosystem and use case scenario. The system 102 may further initiate the silo mode and the resume mode, according to the requirements of the user (for example, the customer or the operator entity), to thereby provide a cost-effective solution for smart contract generation. The system 102 may further detect vulnerabilities in the DLT network 110, to secure the smart contract 120 from unauthorized access.

Figure 2:
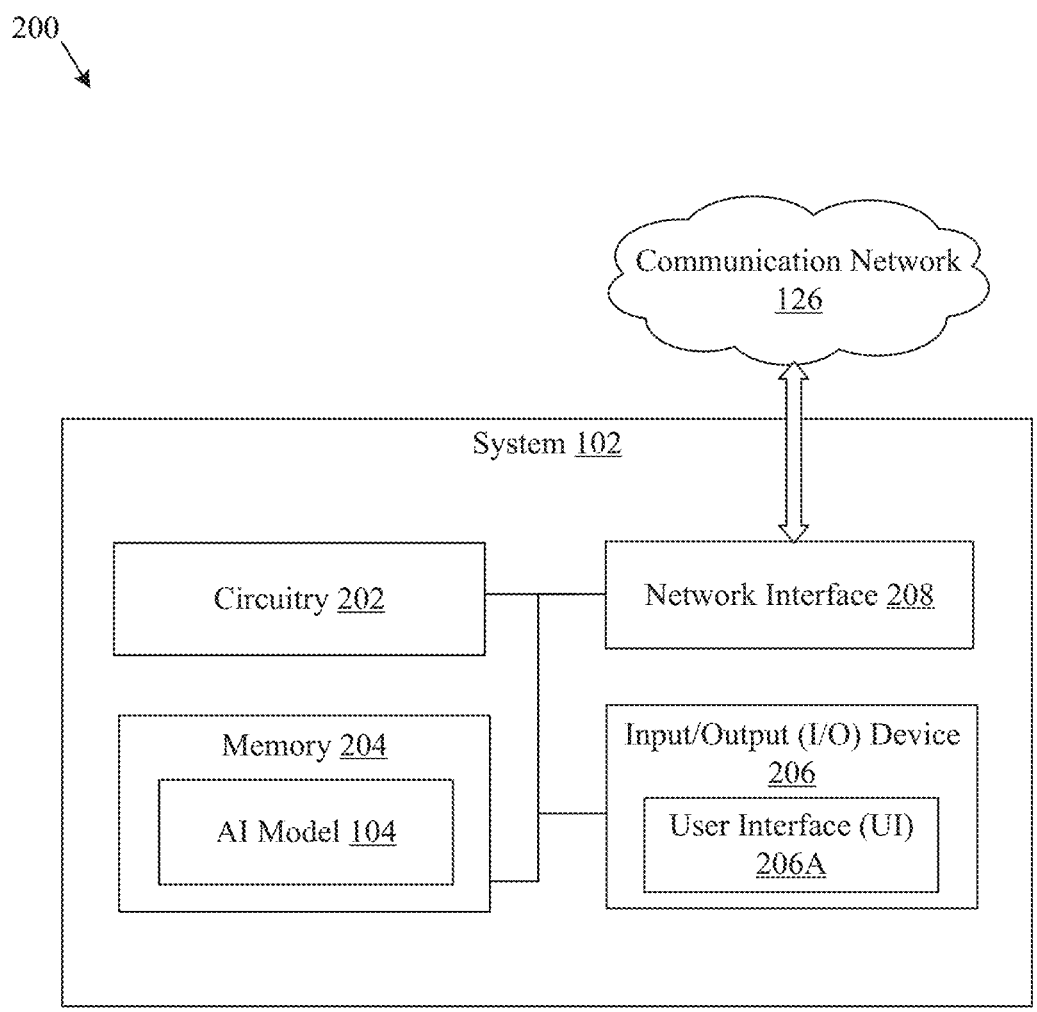
FIG. 2 is an exemplary block diagram of a system for management of a DLT network using an artificial intelligence (AI) model, in accordance with an embodiment of the disclosure.

FIG. 2 is an exemplary block diagram of a system for management of a DLT network using an artificial intelligence (AI) model, in accordance with an embodiment of the disclosure. FIG. 2 is explained in conjunction with elements from FIG. 1. With reference to FIG. 2, there is shown a block diagram 200. The block diagram 200 may include circuitry 202 and a memory 204. The memory 204 may include the AI model 104. The block diagram 200 may further include an input/output (I/O) device 206 and a network interface 208. The I/O device 206 may include a user interface (UI) 206A.

The circuitry 202 may include suitable logic, circuitry, and interfaces that may be configured to execute program instructions associated with different operations to be executed by the system 102. For example, some of the operations may include generation of the smart contract 120 and establishment of the communication between the edge device 106 and the operator entity, such as the first operator entity 116A, based on the generated smart contract 120. The circuitry 202 may be further configured to temporarily suspend the code associated with the generated smart contract 120 in the DLT network 110. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, and interfaces that may be configured to store the one or more instructions to be executed by the circuitry 202. The memory 204 may be configured to store the plurality of parameters and the generated smart contract 120. The memory 204 may be further configured to store the device code and the transaction records. The memory 204 may be further configured to store the AI model 104 and the training dataset of the AI model 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive an input from a user, such as the operator associated with the first operator entity 116A, and provide an output based on the received input. The I/O device 206 which may include various input and output devices, may be configured to communicate with the circuitry 202. In another example, the system 102 may receive, via the I/O device 206, the user input indicative of a selection of the type of DLT network 110 from a plurality of types of the DLT network 110. Examples of the I/O device 206 may include, but are not limited to, a touch screen, a keyboard, a mouse, a joystick, a microphone, a display device, and a speaker.

The UI 206A may be rendered on the I/O device 206 (for example, a display device). The UI 206A may be configured to display the plurality of parameters the device code, and the generated smart contract 120. In some embodiments, the I/O device 206 may include more than one user interfaces, such as a first UI that may display the device code and a second UI that may display the smart contract 120. An example of the UI 206A may include, but is not limited to, a graphical user interface (GUI). Details of the UI 206A for the generation of the smart contract 120 is further described, for example, in FIGS. 9A-9G.

The network interface 208 may include suitable logic, circuitry, and interfaces that may be configured to facilitate communication between the circuitry 202, the edge device 106, and the DLT network 110 via the communication network 126. The network interface 208 may be implemented by use of various known technologies to support wired or wireless communication of the system 102 with the communication network 126. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11 b, IEEE 802.11g or IEEE 802.11 n), voice over Internet Protocol (VoIP), light fidelity (Li-Fi), Worldwide Interoperability for Microwave Access (Wi-MAX), a protocol for email, instant messaging, and a Short Message Service (SMS).

A person of ordinary skill in the art will understand that the system 102 may also include other suitable components, in addition to the components which are illustrated herein to describe and explain the function and operation of the present disclosure. A detailed description for the other components of the system 102 has been omitted from the disclosure for the sake of brevity.

Figure 3:
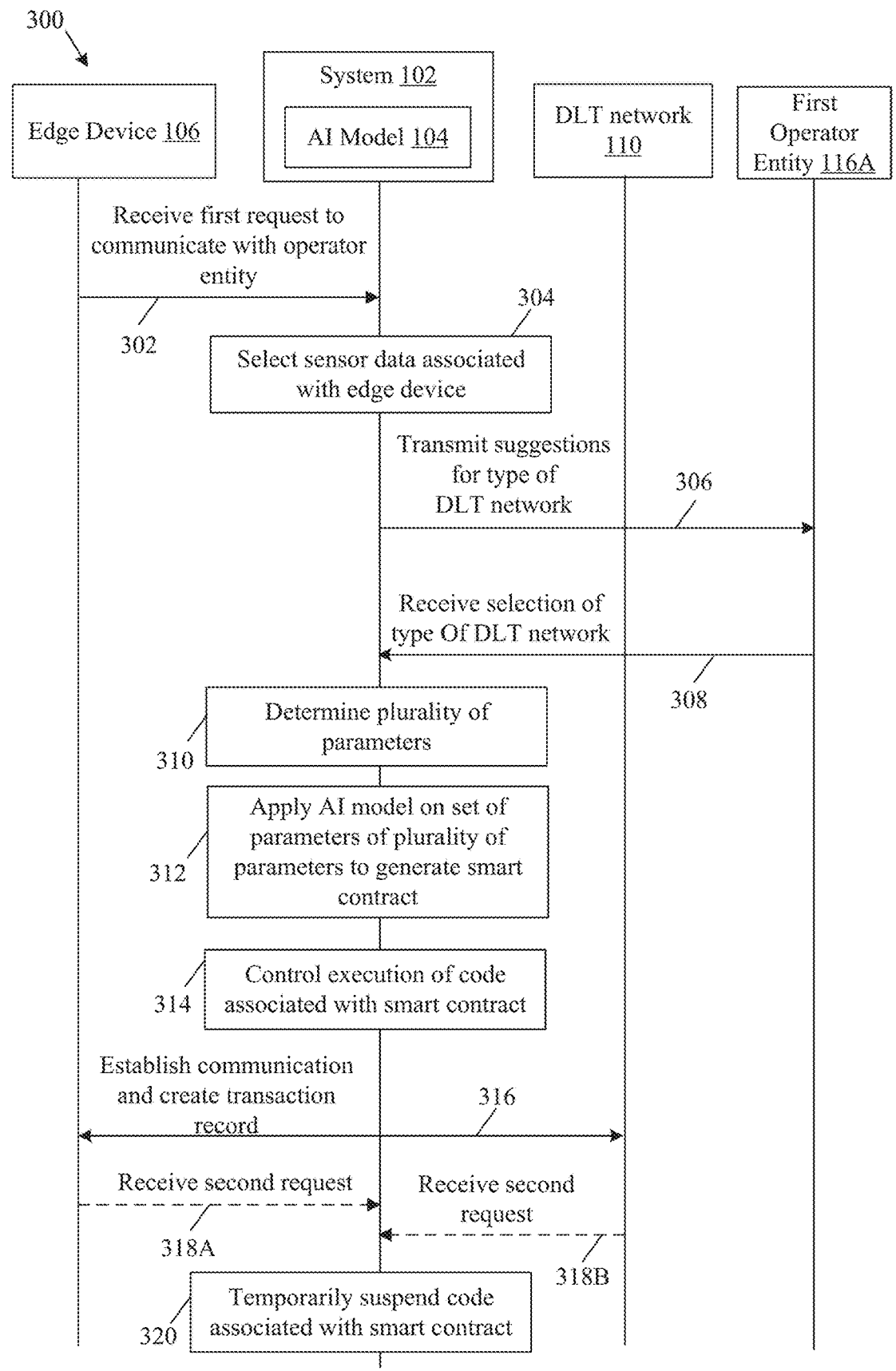
FIG. 3 is an exemplary sequence diagram that illustrates management of communication between an edge device and an operator entity in a DLT network using an artificial intelligence (AI) model, in accordance with an embodiment of the disclosure.

FIG. 3 is an exemplary sequence diagram that illustrates management of communication between an edge device and an operator entity in a DLT network using an artificial intelligence (AI) model, in accordance with an embodiment of the disclosure. FIG. 3 is explained in conjunction with elements from FIGS. 1 and 2. With reference to FIG. 3, there is shown a sequence diagram 300. In the sequence diagram 300, there are shown the system 102 that may include the AI model 104, the edge device 106, and the DLT network 110, and the first operator entity 116A. The sequence diagram 300 may depict exemplary operations from 302 to 332. The exemplary operations illustrated in the sequence diagram 300 may start at 302 and may be performed by any computing system, apparatus, or device, such as by the system 102 of FIG. 1 or the circuitry 202 of FIG. 2.

At 302, a first request may be received from the edge device 106 to communicate with the operator entity, such as the first operator entity 116A in the DLT network 110. In accordance with an embodiment, the circuitry 202 may receive the first request from the edge device 106 to communicate with the first operator entity 116A. For example, the first operator entity 116A may be associated with the MaaS system, and the first request may be associated with booking of a transport service (such as a flight ticket or a cab service) on the MaaS system by the user 108. In an exemplary scenario, the first request may be received by an application on the edge device 106.

At 304, sensor data associated with the edge device 106 may be selected. In accordance with an embodiment, the circuitry 202 may select the sensor data associated with the edge device 106. In an embodiment, the circuitry 202 may also receive information related to a type of a processor and operating system in the edge device 106. Further, the circuitry 202 may receive the sensor data associated with the edge device 106 from the edge device 106. For example, the edge device 106 may be a smartwatch or a smart sensor. In some embodiments, the edge device 106 may include at least one of an image sensor, a temperature sensor, a humidity sensor, a location sensor, a pressure sensor, an accelerometer, a gyroscope, a proximity sensor, a level sensor, a gas sensor, an infrared sensor, a position sensor, or an optical sensor. In some embodiments, the received sensor data may include temperature data from the temperature sensor, humidity level from the humidity sensor, position data from the position sensor, timestamp, etc. In an embodiment, the circuitry 202 may determine the type of sensor data based on information associated with the type of sensor.

In accordance with an embodiment, the circuitry 202 may apply the AI model 104 on the received sensor data and the type of edge device to generate a device code. In some embodiments, the device code may be an IoT code for the edge device 106. In an embodiment, the edge device 106 may be a virtual IoT device. In such a case, the AI model 104 may output the device code for the virtual IoT device. The circuitry 202 may control display of the device code on the UI 206A. In an embodiment, the UI 206A may allow the operator associated with the first operator entity 116A to modify the device code, if desired. An exemplary device code for the edge device 106 is shown:

```
import os
import time
def measure_temp( )
temp=os.popen("vcgencmd measure_temp"). readline ( )
return (temp.replace("temp="," "))
while True:
print(measure_temp( ))
#time.sleep (1)
```

At 306, one or more suggestions for selection of a type of the DLT network 110 for the generation of the smart contract 120 may be output by the AI model 104. In some embodiments, the AI model 104 may be trained to output the one or more suggestions for selection of the type of the DLT network 110. The one or more suggestions may be based on, for example, cost and other requirements to deploy the smart contract 120 on the DLT network 110. For example, the circuitry 202 may suggest that there is no cost incurred to deploy the smart contract 120 on a first type of the DLT network (for example, Hyperledger®). In another example, the circuitry 202 may suggest that certain cost (for example, Ethereum® gas cost) is incurred in units of the native cryptocurrency (for example, Ethers) to deploy the smart contract 120 on a second type of the DLT network (for example, Ethereum®). In an embodiment, the circuitry 202 may transmit the one or more suggestions for the type of the DLT network 110 to the first operator entity 116A. In another embodiment, the circuitry 202 may transmit the one or more suggestions the type of the DLT network 110 to the edge device 106. The type of the DLT network 110 for the generation of the smart contract 120 may be selected by the operator associated with the first operator entity 116A.

At 308, based on the one or more suggestions, a selection of the type of the DLT network 110 for the generation of the smart contract 120 may be received. In accordance with an embodiment, the circuitry 202 may receive the selection of the type of the DLT network 110 from the first operator entity 116A or the edge device 106. For example, the MaaS system may be implemented by means of the Hyperledger® distributed ledger or the Ethereum® distributed ledger in the DLT network 110. The circuitry 202 may receive the selection of the type of the DLT network 110 by the operator as the Hyperledger® distributed ledger.

At 310, the plurality of parameters for the smart contract 120 may be determined. In accordance with an embodiment, the circuitry 202 may determine the plurality of parameters for the smart contract 120. The plurality of parameters may be associated with the edge device 106 and the DLT network 110. In an embodiment, the type of the edge device 106 may be based on the received sensor data. In accordance with an embodiment, the plurality of parameters may include at least one of sensor data associated with the edge device 106, user-specific data associated with the user 108, data associated with specifications of the edge device 106, or data related to the type of the DLT network 110. Examples of the plurality of parameters may include, but not limited to, order identifier, temperature, humidity, music, device type, username, email, phone number, address, song preference, timestamp, etc. For example, the parameters associated with the sensor data may include temperature data, humidity level data, location data of the user 108, and so forth. The parameters associated with the user 108 may include, for example, an order number associated with a transaction, preferences of the user 108, such as, music preference and song preference of the user 108, contact details, such as address, phone number, and email ID, a username, and a timestamp of the first request. The parameters associated with the edge device 106 may include, for example, the type of the edge device 106, such as a smartwatch or the smart sensor, or the hardware specification (for example, processor) in the edge device 106. The parameters associated with the DLT network 110 may include, for example, the type of the first distributed ledger 112A associated with the first operator entity 116A.

At 312, the AI model 104 may be applied to the determined set of parameters to generate the smart contract 120. In accordance with an embodiment, the circuitry 202 may generate the smart contract 120 for communication between the edge device 106 and the operator entity (such as the first operator entity 116A) in the DLT network 110. In some embodiments, the circuitry 202 may generate the smart contract 120 based on the generated device code. The AI model 104 may output a code (such as a chaincode) associated with the smart contract 120. The circuitry 202 may control the display of the chaincode on the UI 206A. In an embodiment, the UI 206A may allow the operator associated with the first operator entity 116A to modify the chaincode, if desired. An exemplary code for the smart contract 120 is shown as follows:

func (t*SimpleChaincode) Init (stub shim.ChaincodesStubInterface)
pb.Response {
_, args:=stub.GetFunctionAndParameters ( )
var A, B string
var Aval, Bval int
var err error
if len (args) !=4 {
return shim.Error("Incorrect number of arguments. Expecting 4")
}

At 314, the execution of the code associated with the smart contract 120 may be controlled. The circuitry 202 may control the execution of the code associated with the smart contract 120 to create the transaction record on the DLT network 110. The code may be executed to enable the communication between the edge device 106 and the DLT network 110 (such as the first operator entity 116A of the DLT network 110).

At 316, the communication between the edge device 106 and the DLT network 110 may be established. In accordance with an embodiment, the circuitry 202 may establish the communication between the edge device 106 and the DLT network 110 (such as the first operator entity 116A of the DLT network 110). Based on the communication, the transaction record may be created on the DLT network 110. For example, the transaction record may be associated with booking of a cab service by the user 108. For example, the transaction record may include the timestamp of the first request associated with the booking of the cab service, a source location of the user 108, and a destination location of the user 108 as specified by the user 108. The circuitry 202 may create the transaction record on the first distributed ledger 112A associated with the MaaS system. Based on the transaction record, the operator entity (such as the first operator entity 116A) may provide the cab service to the user 108, and the circuitry 202 may notify the user 108 of a status of the cab service.

At 318A, a second request may be received from the edge device 106. In accordance with an embodiment, the circuitry 202 may receive the second request from the edge device 106 associated with the user 108. The second request may correspond to an initiation of a silo mode for the edge device 106. Details of the initiation of the silo mode for the edge device 106 are further described, for example in FIG. 4.

At 318B, the second request may be received from the DLT network 110. In accordance with an embodiment, the circuitry 202 may receive the second request from the DLT network 110. The second request may correspond to an initiation of the silo mode for the DLT network 110. The circuitry 202 may receive the second request from one of the edge device 106 (such as at 318A) or the DLT network 110 (such as at 318B). Details of the initiation of the silo mode for the DLT network 110 are further described, for example in FIG. 5A.

At 320, the code (for example, chaincode) associated with the smart contract 120 may be temporarily suspended in the DLT network 110. In accordance with an embodiment, the circuitry 202 may temporarily suspend the code associated with the smart contract 120 in the DLT network 110 based on the second request from one of the edge device 106 or the DLT network 110 (such as the first operator entity 116A of the DLT network 110). Details of the temporary suspension of the code are further described, for example in FIGS. 4 and 5. In an embodiment, the circuitry 202 may resume the suspended code or redeploy the code associated with the smart contract 120 on the DLT network 110 at any point in time.

In an exemplary scenario, the first operator entity 116A may be associated with the MaaS system. The system 102 may provide a login feature from the edge device 106 to the MaaS system. The system 102 may provide recommendation of travel route based on traffic and previous travel scenarios. The communication between the edge device 106 and the DLT network 110 may allow the user 108 to reach the destination via the fastest route in a time efficient manner. For example, a first operator of the MaaS system may be unavailable at the time of first request. The MaaS system may connect the edge device 106 associated with the user 108 with a second operator, which may service the request of the user 108 (such as booking of the cab service). Further, the MaaS system may provide a feature to pay for the service after the user 108 reaches the destination. Further, the MaaS system may record audio data, video data, and biometric data (such as fingerprint) associated with a driver of the cab service. Such details may be processed before booking the cab service, thereby providing a safe travel experience for the user 108. Further, the system 102 may provide uninterrupted connectivity between the first operator entity 116A and the edge device 106 throughout the service. The system 102 may provide a single DLT platform driven service across the operator entities, such that the edge device 106 may connect with different operator entities in the MaaS system without sharing personal business information.

In another exemplary scenario, the first operator entity 116A may be associated with the consumer retail establishment, such as the shopping mall. The communication between the edge device 106 and the DLT network 110 may allow the user 108 to shop anytime at any location. The communication between the edge device 106 and the DLT network 110 may allow the user 108 to access reward points credited to the user 108 for shopping. The system 102 may allow use of the reward points at any shopping mall that may be a part of the DLT network 110. For example, reward points may be managed using non-fungible tokens (NFT) as described, for example, in FIG. 12B. The system 102 may capture scanned information of the shopped items and quick response (QR) code information of the edge device 106 for later processing. the system 102 may be provide an option to the operator entities to choose the DLT network 110 as a private network or a public network. The system 102 may allow ease of shopping experience to the user 108 (such as the customers), which may in turn lead to increased sales for different operators. The system 102 may enable online interaction between multiple users of the DLT network 110 and share their shopping experience with respect to multiple operator entities.

In another exemplary scenario, the first operator entity 116A may be associated with the medical facility, such as the hospital. The communication between the edge device 106 and the DLT network 110 may allow monitoring of the sensor data, such as oxygen level, blood pressure level, pulse rate, or body temperature associated with the user 108. The edge device 106 may be a wearable device that may be worn by the user 108. The wearable device may connect to the first operator entity 116A (such as a hospital server) that may store the monitored sensor data associated with the user 108. Furthermore, the system may record the biometric data (such as the fingerprint data) associated with the user 108 (such as a patient) and a caretaker in the medical facility, to restrict access to sensitive medical information associated with the user 108 based on the biometric data.

Although the sequence diagram 300 is illustrated as discrete operations, such as 302, 304, 306, 308, 310, 312, 314, 316, 318, and 320, however, in certain embodiments, such discrete operations may be further divided into additional operations, combined into fewer operations, or eliminated, depending on the particular implementation without detracting from the essence of the disclosed embodiments.

Figure 4:
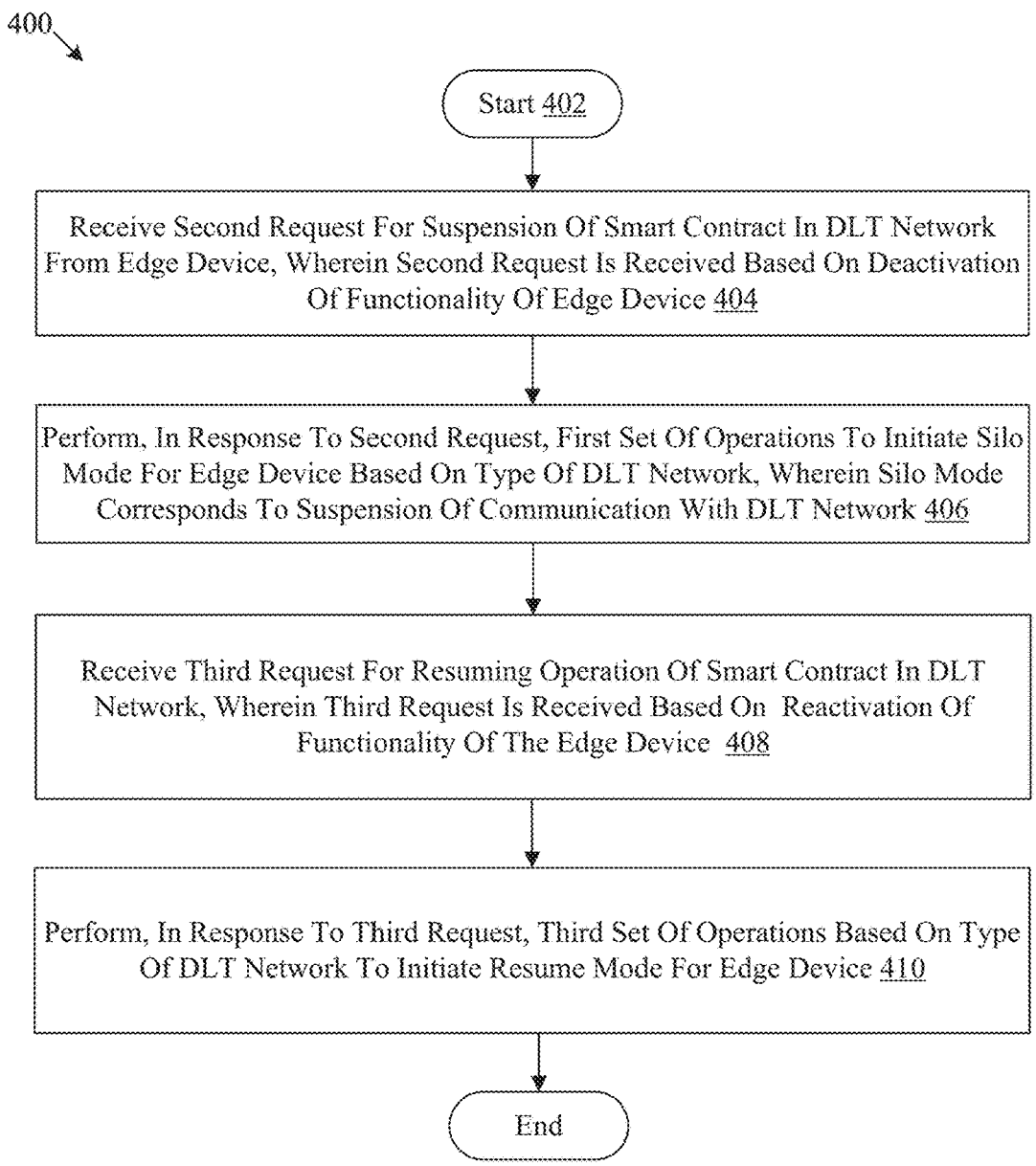
FIG. 4 illustrates an exemplary flowchart of a method for management of a silo mode and a resume mode for an edge device, in accordance with an embodiment of the disclosure.

FIG. 4 illustrates an exemplary flowchart of a method for management of a silo mode and a resume mode for an edge device, in accordance with an embodiment of the disclosure. FIG. 4 is described in conjunction with elements from FIGS. 1, 2 and 3. With reference to FIG. 4, there is shown a flowchart 400. The exemplary method of the flowchart 400 may be executed by any computing system, for example, by the system 102 of FIG. 1 or the circuitry 202 of FIG. 2. The exemplary method of the flowchart 400 may start at 402 and may proceed to 404.

At 404, a second request for suspension of the smart contract 120 in the DLT network 110 may be received from the edge device 106, wherein the second request may be received based on deactivation of a functionality of the edge device 106. In accordance with an embodiment, the circuitry 202 may be configured to receive the second request for the suspension of the smart contract 120 in the DLT network 110 from the edge device 106. The second request may be received based on deactivation of a functionality of the edge device 106. In some embodiments, one or more operations associated with the communication of the edge device 106 and the DLT network 110 may be paused by the user 108. In such a case, the functionality of the edge device 106 may be deactivated. Based on the deactivation of the functionality of the edge device 106, the circuitry 202 may receive the second request.

At 406, in response to the second request, a first set of operations may be performed to initiate the silo mode for the edge device 106 based on the type of the DLT network 110, wherein the silo mode may correspond to the suspension of the communication with the DLT network 110. In accordance with an embodiment, the circuitry 202 may be configured to perform, in response to the second request, the first set of operations to initiate the silo mode for the edge device 106 based on the type of the DLT network 110. The silo mode may correspond to the suspension of the communication with the DLT network 110. In an embodiment, the silo mode may be suggested or initiated by the AI model 104 to temporally suspend operations between the edge device 106 and the DLT network 110 in runtime. The initiation of the silo mode may allow the user 108 and/or the operator to save costs related to operations. In another embodiment, the silo mode may be initiated by user 108.

In an exemplary scenario, in the medical facility ecosystem, one or more imaging devices or sensors of the edge device 106 used for monitoring may be turned off, and the monitoring of the patient and the sensor data (such as oxygen level) may be paused. In the MaaS ecosystem, sensors such as imaging devices that may be utilized to keep a check on personal belongings of the user 108 may be paused at certain times. In the consumer retail ecosystem, the imaging devices may be utilized to keep a check on belongings (such as wallet of the user 108) in crowded places (such as a shopping mall). In a case where the imaging devices or sensors may be turned off during periods of inactivity or at the completion of the service, the AI model 104 may recommend the edge device 106 to enter the silo mode.

In accordance with an embodiment, the first set of operations may include deactivation of the chaincode or a node associated with the smart contract 120, and pausing of the smart contract 120 applicable for the communication between the edge device 106 and the operator entity (such as the first operator entity 116A) for a first time period. For example, the circuitry 202 may deactivate the chaincode associated with the smart contract 120 to initiate the silo mode for the edge device 106. Furthermore, the circuitry 202 may pause the smart contract 120 applicable for the communication between the edge device 106 and the operator entity (such as the first operator entity 116A) for the first time period. In an exemplary scenario, in a case where the silo mode is performed at the backend 122, and the first distributed ledger 112A is the Hyperledger®, the circuitry 202 may delete the data associated with the edge device 106 from the database 124. In a case where the silo mode is performed at the backend 122, and the first distributed ledger 112A is the Ethereum®, the circuitry 202 may deactivate the smart contract 120.

Table 1 illustrates the operations of the blocks involved in the execution of the silo mode for each use case. As seen in Table 1, depending on the use case, each of the blocks perform a set of operations to execute the silo mode. For example, the imaging devices may be turned off by the frontend 118, and their features may be turned off by the script running at the backend 122. The communication from the edge device 106 to the DLT network 110 me be suspended, and the transaction record may be offloaded to a local database (for example, the database 124).

TABLE 1

Silo mode: Operation of Blocks for Each Use case

| Sl. no | Blocks | Medical Facility | Shopping Mall | MaaS |
|---|---|---|---|---|
| 1. | Frontend 118 | Camera is turned off by frontend | Camera is turned off by frontend | Raspy chip inbuilt with personal stuff is deactivated |
| 2. | Backend 122 | Camera features are turned off by script | Camera features are turned off by script | Raspy chip python program is halted |
| 3. | DLT network 110 | Data pushed to DLT stops once camera is turned off | Data pushed to DLT stops once camera is turned off | Data pushed to DLT stops once Raspy is turned off |
| 4. | AI model 104 | Off chain data starts loading in database and AI operation starts | Off chain data starts loading in database and AI operation starts | Off chain data starts loading in database and AI operation starts |

Table 2 illustrates the advantages of silo mode in terms of memory utilization, cost, and overall operation against one day of normal mode operation.

TABLE 2

Advantages of silo mode against normal mode

| Sl. no | Features | Normal Mode | Silo Mode |
|---|---|---|---|
| 1. | Memory | Standard utilization (i.e. 24 hours). Memory utilization of 5 GB is assumed. | Assuming Silo mode is initiated after 16 hours, the load is shared to local database and memory utilization is reduced. |

TABLE 2-continued

Advantages of silo mode against normal mode

| Sl. no | Features | Normal Mode | Silo Mode |
|---|---|---|---|
| 2. | Cost | Memory cost for 24 hrs. One time cost involved for execution. | Cost until Silo mode is initiated. Execution re-cost involved. |
| 3. | Performance | Performance hampers when data increases | Data is shared after Silo mode, and thereby performance increases. |

At 408, a third request may be received for resuming an operation of the smart contract 120 in the DLT network 110, wherein the third request may be received based on a reactivation of the functionality of the edge device 106. In accordance with an embodiment, the circuitry 202 may receive the third request for resuming the operation of the smart contract 120 in the DLT network 110 from the edge device 106. The third request may be received based on the reactivation of the functionality of the edge device 106. For example, the third request may be received in a case where the service of the first operator entity 116A is requested again by the user 108, and the functionality of the edge device 106 is reactivated.

At 410, in response to the third request, a third set of operations may be performed based on a type of the DLT network 110 to initiate a resume mode for the edge device 106. In accordance with an embodiment, the circuitry 202 may be configured to perform the third set of operations, in response to the third request, based on the type of the DLT network 110 to initiate the resume mode for the edge device 106 from the silo mode. Control may pass to end.

In accordance with an embodiment, the third set of operations may include a restart of the communication between the edge device 106 associated with the user 108 and the operator entity (such as the first operator entity 116A) in the DLT network 110, by use of an application programming interface (API). The display of the API may show an ON/OFF button that may be toggled to initiate the resume mode. For example, the button may be toggled to "ON" to restart of the communication between the edge device 106 and the first operator entity 116A. In an example, in a case where the first operator entity 116A is associated with the medical facility or the consumer retail establishment, and the resume mode is performed at the frontend 118, the imaging devices may be turned on at the frontend 118.

Although the flowchart 400 is illustrated as discrete operations, such as 404, 406, 408 and 410, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 5A:
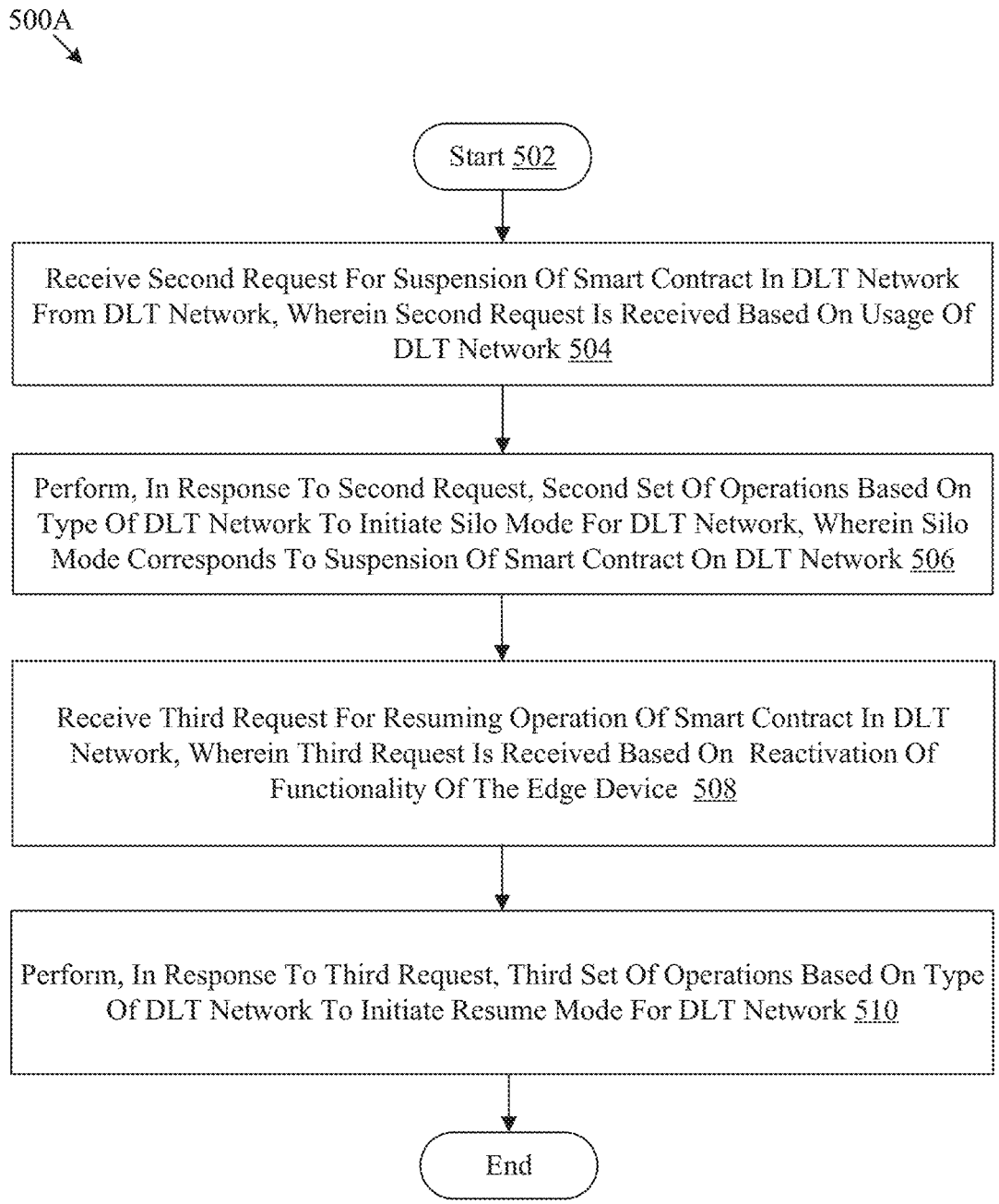
FIG. 5A illustrates an exemplary flowchart of a method for management of a silo mode and a resume mode for a DLT network, in accordance with an embodiment of the disclosure.

FIG. 5A illustrates an exemplary flowchart of a method for management of a silo mode and a resume mode for a DLT network, in accordance with an embodiment of the disclosure. FIG. 5A is described in conjunction with elements from FIGS. 1-4. With reference to FIG. 5A, there is shown a flowchart 500A. The exemplary method of the flowchart 500A may be executed by any computing system, for example, by the system 102 of FIG. 1 or the circuitry 202 of FIG. 2. The exemplary method of the flowchart 500A may start at 502 and may proceed to 504.

At 504, a second request for suspension of the smart contract 120 in the DLT network 110 may be received from the DLT network 110, wherein the second request may be received based on usage of the DLT network 110. In accordance with an embodiment, the circuitry 202 may be configured to receive the second request for suspension of the smart contract 120 in the DLT network 110 from the DLT network 110. The second request may be received based on usage of the DLT network 110. In some embodiments, the AI model 104 may automatically pause the operations associated with the communication of the edge device 106 and the DLT network 110 based on disuse of the smart contract 120 for a period of time to save operation costs.

At 506, in response to the second request, a second set of operations may be performed to initiate the silo mode for DLT network 110 based on the type of the DLT network 110, wherein the silo mode may correspond to the suspension of the smart contract 120 on the DLT network 110. The silo mode may be requested by the DLT network to temporaly suspend operations between the edge device 106 and the DLT network 110 in runtime. In accordance with an embodiment, the circuitry 202 may be configured to perform, in response to the second request, the second set of operations to initiate the silo mode for the DLT network 110 based on the type of the DLT network 110. The silo mode may correspond to the suspension of the smart contract 120 on the DLT network 110.

In accordance with an embodiment, the second set of operations may include deactivation of the code associated with the smart contract 120, and offloading of the data associated with the edge device 106 and the transaction record to a local database (for example, the database 124) associated with the DLT network 110. The circuitry 202 may deactivate the chaincode associated with the smart contract 120 to initiate the silo mode for the DLT network 110. The circuitry 202 may offload data associated with the edge device 106 and the transaction record from the DLT network 110 to the database 124. For example, in a case where the silo mode operation is performed at the backend 122, and the first distributed ledger 112A is the Hyperledger®, the circuitry 202 may offload the data associated with the edge device 106 to the local database. In some embodiments, the second set of operations may include deactivation of the smart contract 120 for a second time period based on the type of the DLT network 110. For example, in case where the silo mode operation is at the backend 122, and the first distributed ledger 112A is the Ethereum®, the circuitry 202 may deactivate the smart contract 120.

In an exemplary scenario, in a case where the first operator entity 116A is associated with the medical facility or the consumer retail establishment, and the silo mode operation is initiated for the DLT network 110, the data associated with the edge device 106 and the user 108 may be stopped from being pushed to the DLT network 110. As shown in Table 2, the initiation of the silo mode may ensure reduced usage of the memory 204, thereby enhancing the overall performance of the DLT network 110.

At 508, a third request may be received for resuming an operation of the smart contract 120 in the DLT network 110, wherein the third request may be received based on the reactivation of the functionality of the edge device 106. Example use cases for interoperability across different types of DLT networks and different types of IoT devices in conjunction with silo and resume modes are described with reference to FIGS. 5B-5D and Tables 3 and 4. In accordance with an embodiment, the circuitry 202 may receive the third request for resuming the operation of the smart contract 120 in the DLT network 110 from the DLT network 110. For example, the third request may be received based on the reactivation of the functionality of the edge device 106. For example, the operator associated with the first operator entity 116A may need to resume the operation of the smart contract 120 in the DLT network 110 based on a service request from the edge device 106.

At 510, in response to the third request, a third set of operations may be performed based on the type of the DLT network 110 to initiate the resume mode for the DLT network 110. In accordance with an embodiment, the circuitry 202 may be configured to perform, in response to the third request, the third set of operations based on the type of the DLT network 110 to initiate the resume mode for the DLT network 110 from the silo mode. Control may pass to end.

In accordance with an embodiment, the third set of operations may include restart of the suspended code associated with the smart contract 120 on the DLT network 110 based on the type of the DLT network 110 and the transaction record. The circuitry 202 may restart the code associated with the smart contract 120 that may be suspended during the silo mode. The third set of operations may further include redeployment of the code associated with the smart contract 120 on the DLT network 110 based on the determined plurality of parameters and the type of the DLT network 110. The circuitry 202 may be configured to redeploy the code associated with the smart contract 120 on the DLT network 110 using the same plurality of parameters based on the type of the DLT network 110. The operations associated with the DLT network 110 may be resumed based on the restart of the code or the redeployment of the code.

Although the flowchart 500A is illustrated as discrete operations, such as 504, 506, 508 and 510, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 5B:
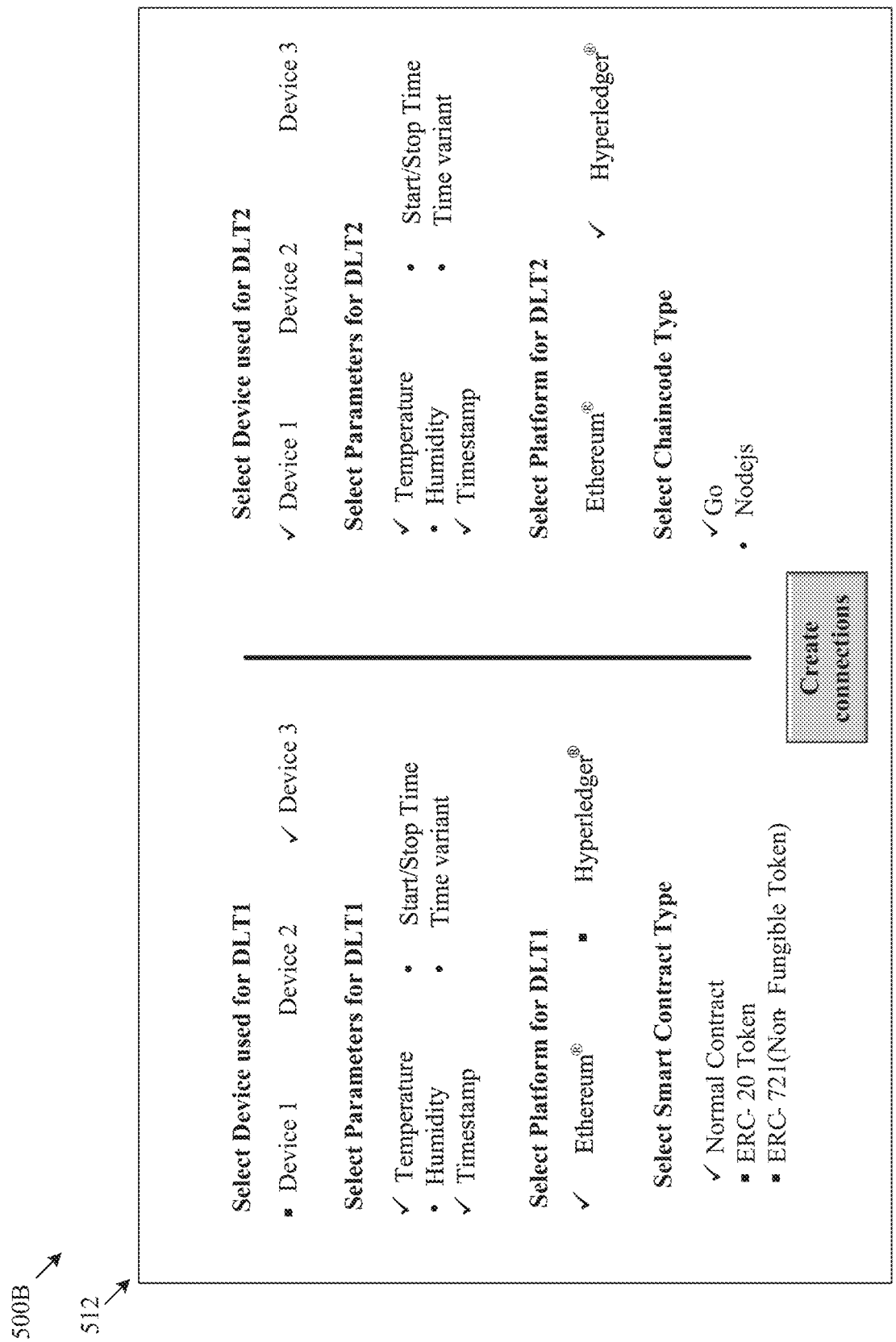

FIGS. 5B-5D are diagrams that collectively illustrate user interfaces for interoperability of smart contract across different types of DLT networks and different types of IoT devices with silo and resume modes, in accordance with an embodiment of the disclosure.

In the example use case scenario of FIGS. 5B-5D, a local hospital A runs its services using Hyperledger® blockchain. Another hospital B is an Ethereum®—based multispecialty hospital. A patient being treated in hospital A requires an upgrade to hospital B, and hospital A wishes to suspend one of its department's operations for a period of time and resume the operations with the same configuration at a later point in time.

In operation, the circuitry 202 may retrieve device data (such as temperature) using IoT contract for the user of hospital A. Based on the device data, the circuitry 202 may generate a smart contract 120 based on the use case and corresponding requirements, and may deploy the smart contract 120 on the DLT network 110 (such as Hyperledger®). The circuitry 202 may automatically generate IoT contract in the DLT network 110 associated with hospital A, and may enable the smart contract 120 for hospital A on the DLT network 110. During the treatment, the patient may require added service which is available in hospital B only.

The system 102 may enable interoperability feature between the DLT network 110 of hospital A and the DLT network 110 of hospital B. The circuitry 202 may generate IoT contract and smart contract 120 for hospital B related to required services of the patient. The circuitry 202 may then share patient data from hospital A with hospital B. For example, the data pushed in Hyperledger® when required, may be sent via Nodejs using API calls to the DLT network 110 (such as Ethereum® Blockchain) associated with hospital B. At this time, hospital A wishes to put its operations into SILO mode to resume at a later point in time. The data may be shared with Ethereum® Blockchain associated with hospital B using API calls. The data received may be used by Ethereum® Blockchain associated with hospital B, and the device associated with hospital B may save the data in a physical IoT or a virtual device. Hospital B may start providing the required services based on shared patient data from hospital A. Hospital B may provide the additional services without losing any data of hospital A, and may ensure that services are resumed from the point which were suspended at hospital A. The system 102 thereby enables seamless interoperability between different DLT networks, such as between homogenous networks (for example, Ethereum®-Ethereum®) and heterogenous networks (for example, Ethereum®-Hyperledger®) with different ecosystems for the same or different use case.

With reference to FIG. 5B, there is shown an exemplary scenario 500B. In the exemplary scenario 500B, there is shown a user interface 512 that may be generated by the frontend 118 for display on a device associated with the operator entity (such as the first operator entity 116A) or the edge device 106. In the exemplary scenario 500B, the circuitry 202 may generate the user interface 512 for creating a connection between DLT 1 associated with a first operator entity (for example, hospital A) and DLT 2 associated with a second operator entity (for example, hospital B) for seamless transition of services based on the interoperability features of the system 102. As shown in FIG. 5B, the user interface 512 includes options for selecting devices among device 1 (Raspberry pi4), device 2 (Jetson board), or device 3 (Raspberry pi3) used for DLT 1 and DLT 2, options for selecting parameters (such as temperature, humidity, timestamp, start/stop time, time variant, etc.) for DLT 1 and DLT 2, options for selecting the types of network (such as Ethereum® or Hyperledger®) for DLT 1 and DLT 2, options for selecting the type of smart contract (such as Normal, ERC-20, ERC-721, etc.) of DLT 1, and options for selecting the type of chaincode for DLT 2. Upon selection, the circuitry 202 may receive the user input to create connections via the "Create Connections" button. The circuitry 202 may synchronize the patient data between DLT 1 and DLT 2, and may transition from the service provisioned via DLT 1 of the first operator entity (for example, hospital A) to the service provisioned via DLT 2 of the second operator entity (for example, hospital B).

With reference to FIG. 5C, there is shown an exemplary scenario 500C. In the exemplary scenario 500C, there is shown a user interface 514 that may be generated by the frontend 118 for display on a device associated with the operator entity (such as the first operator entity 116A) or the edge device 106. In the exemplary scenario 500C, the circuitry 202 may generate the user interface 514 for initiating silo mode for the smart contract 120 (and its corresponding operation) of the first operator entity (for example, hospital A). For example, the user interface 514 may display options for selecting parameters, such as selecting silo mode device among device 1 (Raspberry pi4), device 2 (Jetson board), or device 3 (Raspberry pi3), and selecting silo mode smart contract. Upon selection, the circuitry 202 may receive the user input to initiate silo mode via the "Submit" button. The circuitry 202 may put the smart contract of the first operator entity (for example, hospital A) in silo mode.

With reference to FIG. 5D, there is shown an exemplary scenario 500D. In the exemplary scenario 500D, there is shown a user interface 516 that may be generated by the frontend 118 for display on a device associated with the operator entity (such as the first operator entity 116A) or the edge device 106. In the exemplary scenario 500D, the circuitry 202 may generate the user interface 516 for initiating resume mode for the smart contract 120 of the first operator entity (for example, hospital A) back from the silo mode. For example, the user interface 514 may display options for selecting parameters, such as selecting resume mode device among device 1 (Raspberry pi4), device 2 (Jetson board), or device 3 (Raspberry pi3), and selecting resume mode smart contract. Upon selection, the circuitry 202 may receive the user input to initiate resume mode via the "Submit" button. The circuitry 202 may resume the smart contract of the first operator entity (for example, hospital A) back from the silo mode.

Table 3 shows interoperability possibilities for different combinations of IoT device types and DLT network types.

TABLE 3

Interoperability possibilities for different combinations of IoT device types and DLT network types

| Sl. NO | Feature | Homogenous (within same DLT network) | Heterogenous (Within same DLT network) | Homogenous (outside DLT network) | Heterogenous (outside DLT network) |
|---|---|---|---|---|---|
| 1 | IOT Homogenous (IOT1 = IOT2). Devices belonging to same type, or which may have same configuration. | IOT devices communicating with same DLT network type such as Ethereum ® and Ethereum ® network in the same ecosystem can be achieved. | IOT devices communicating with different Blockchain network such as Ethereum ® and Hyperledger ® within different ecosystem can be achieved. | IOT devices communicating with two similar Blockchain networks such as Ethereum ® and Ethereum ® with same ecosystem but outside DLT networks (i.e. two ecosystems having different DLT platform) | IOT devices communicating with two different Blockchain networks such as Ethereum ® and Hyperledger ® with different ecosystem can be achieved. |

TABLE 3-continued

Interoperability possibilities for different combinations of IoT device types and DLT network types

| Sl. NO | Feature | Homogenous (within same DLT network) | Heterogenous (Within same DLT network) | Homogenous (outside DLT network) | Heterogenous (outside DLT network) |
|---|---|---|---|---|---|
| 2 | IOT Heterogenous (IOT1 != IOT2). Devices belonging to different type and has different configurations. | Different IOT configurations communicates with same DLTs such as Ethereum ® and Ethereum ® network in the same ecosystem | Different IOT configuration with different Blockchain network such as Ethereum ® and Hyperledger ® within different ecosystems would be possible when protocol and configuration differences match | Different IOT configurations with two similar Blockchain networks such as Ethereum ® and Ethereum ® with same ecosystem can be achieved | Different IOT configuration with two different Blockchain networks such as Ethereum ® and Hyperledger ® with different ecosystems would be achievable once different protocols and mismatched configuration match |

Table 4 shows interoperability possibilities for different combinations of IoT device types and DLT network types with non-fungible token (NFT) support.

TABLE 4

Interoperability possibilities for different combinations of IoT device types and DLT network types with non-fungible token (NFT) support

| Sl. NO | Feature | Homogenous (within same DLT network) | Heterogenous (Within same DLT network) | Homogenous (outside DLT network) | Heterogenous (outside DLT network) |
|---|---|---|---|---|---|
| 1 | IOT Homogenous (IOT1 = IOT2). Devices belonging to same type, or which may have same configuration. | IOT devices communicating with same DLTs such Ethereum ® and Ethereum ® network in the same ecosystem can be achieved | IOT devices communicating with different Blockchain networks such as Ethereum ® and Hyperledger ® within different ecosystems | IOT devices communicating with two similar Blockchain networks such as Ethereum ® and Ethereum ® with two Silo devices can be achieved | IOT devices communicating with two different Blockchain networks such as Ethereum ® and Hyperledger ® with different ecosystems |
| 2 | IOT Heterogenous (IOT1 != IOT2). Devices belonging to different types and has different configurations. | Different IOT configurations communicates with the same DLT such as Ethereum ® and Ethereum ® network in the same ecosystem can be achieved, | Different IOT configuration with different Blockchain networks such as Ethereum ® and Hyperledger ® within different ecosystem would be possible once protocol and configuration match | Different IOT configurations with two similar Blockchain networks such as Ethereum ® and Ethereum ® with the same ecosystem would be achievable. | Different IOT configurations with two different Blockchain networks such as Ethereum ® and Hyperledger ® with different ecosystem would be possible once different protocols and mismatched configuration match |

Figure 6:
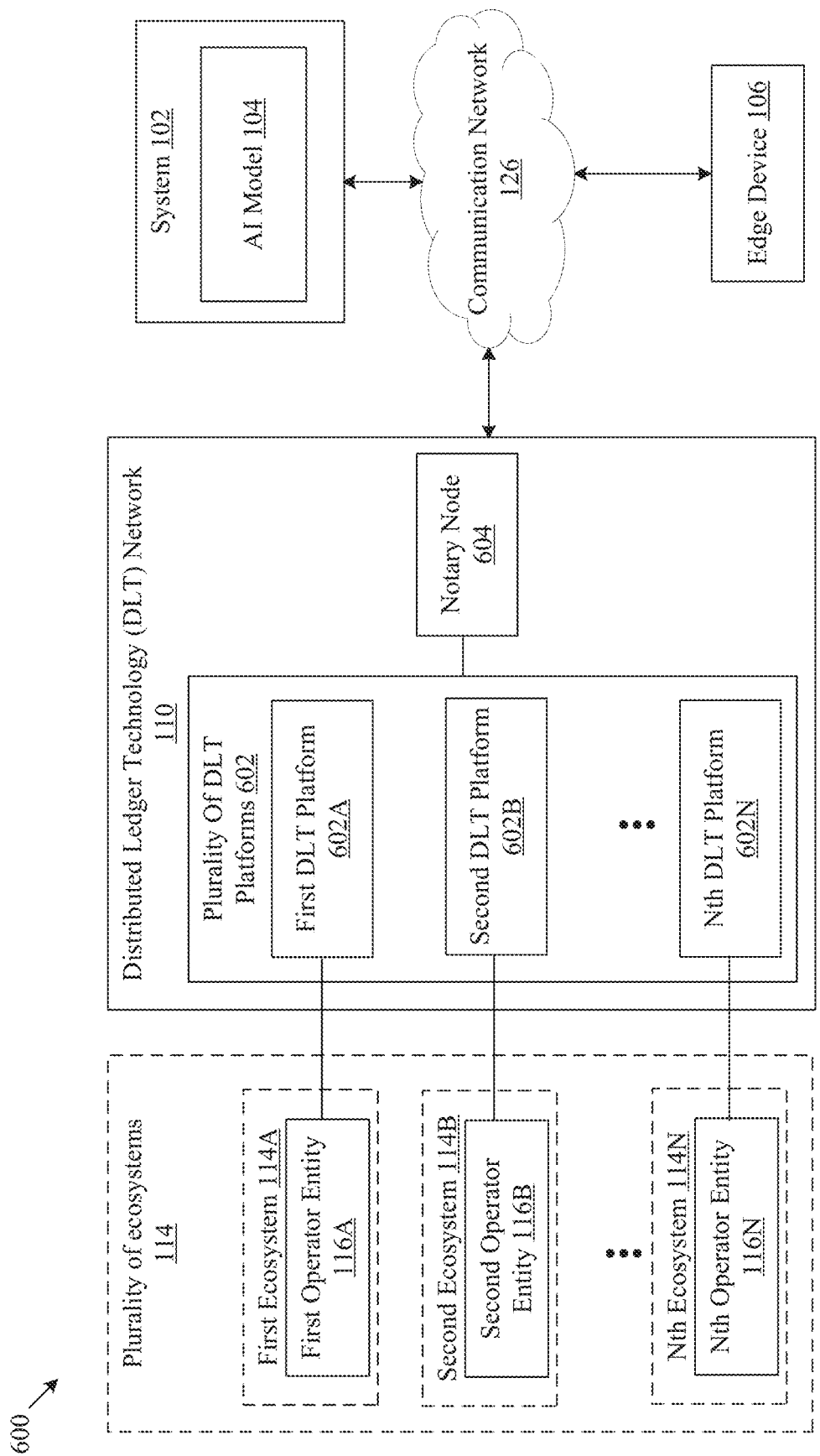
FIG. 6 is a diagram that illustrates a notary function for identification of an unauthorized transaction between an edge device and a DLT platform, in accordance with an embodiment of the disclosure.

FIG. 6 is a diagram that illustrates a notary function for identification of an unauthorized transaction between an edge device and a DLT platform, in accordance with an embodiment of the disclosure. FIG. 6 is described in conjunction with elements from FIGS. 1-5D. With reference to FIG. 6, there is shown an exemplary diagram 600. In the exemplary diagram 600, there is shown a plurality of DLT platforms 602 in the DLT network 110. In the exemplary diagram 600, there is further shown a notary node 604 associated with the plurality of DLT platforms 602.

In accordance with an embodiment, the circuitry 202 may be further configured to connect with the plurality of operator entities, such as the first operator entity 116A, the second operator entity 116B and the Nth operator entity 116N associated with the plurality of ecosystems, such as the first ecosystem 114A (for example, MaaS), the second ecosystem 114B (for example, medical facility), and the Nth ecosystem 114N (for example, consumer retail). The circuitry 202 may connect the notary node 604 with the plurality of DLT platforms 602 each associated with the corresponding operator entity of the plurality of operator entities.

The plurality of DLT platforms 602 may include a first DLT platform 602A, a second DLT platform 602B, and an Nth DLT platform 602N. Each DLT platform of the plurality of DLT platforms 602 may include a set of distributed ledgers associated with a specific ecosystem. For example, the first ecosystem 114A may be associated with the MaaS system. The first DLT platform 602A corresponding to the first ecosystem 114A may include the Hyperledger® and the Ethereum® implementation of the distributed ledgers for the MaaS system. The generated plurality of DLT platforms 602 may provide a unified platform for the plurality of ecosystems (such as the MaaS system, the medical facility, and the consumer retail).

In an embodiment, the DLT network 110 may include the notary node 604, which may be connected to the plurality of DLT platforms 602, such as the first DLT platform 602A, the second DLT platform 602B, and the Nth DLT platform 602N. The circuitry 202 may be configured to identify an unauthorized transaction between one or more DLT platforms of the plurality of DLT platforms 602 and the edge device 106 using the notary node 604. The notary node 604 may be configured to check a current status of each distributed ledger in the plurality of DLT platforms 602. In an embodiment, the notary node 604 may act as a mediator to identify the unauthorized transaction between one or more DLT platforms in one of a public distributed ledger (for example, Ethereum®) or a private environment, such as in the private distributed ledger (for example, the Hyperledger®). The notary node 604 may enable communication between the plurality of DLT platforms 602 associated with the plurality of ecosystems 114, without sharing business information associated with each ecosystem.

In an embodiment, the notary node 604 may provide an interoperability solution across the plurality of ecosystems (or use cases). The plurality of DLT platforms 602 may connect with the notary node 604 via an interoperability plugin. The interoperability plugin may enable addition of any new ecosystem to the system 102 in runtime. The notary node 604 may verify the interaction of the new ecosystem with the DLT network 110, and control selection and/or generation of random nodes and super nodes in the DLT network 110 accordingly.

Figure 7:
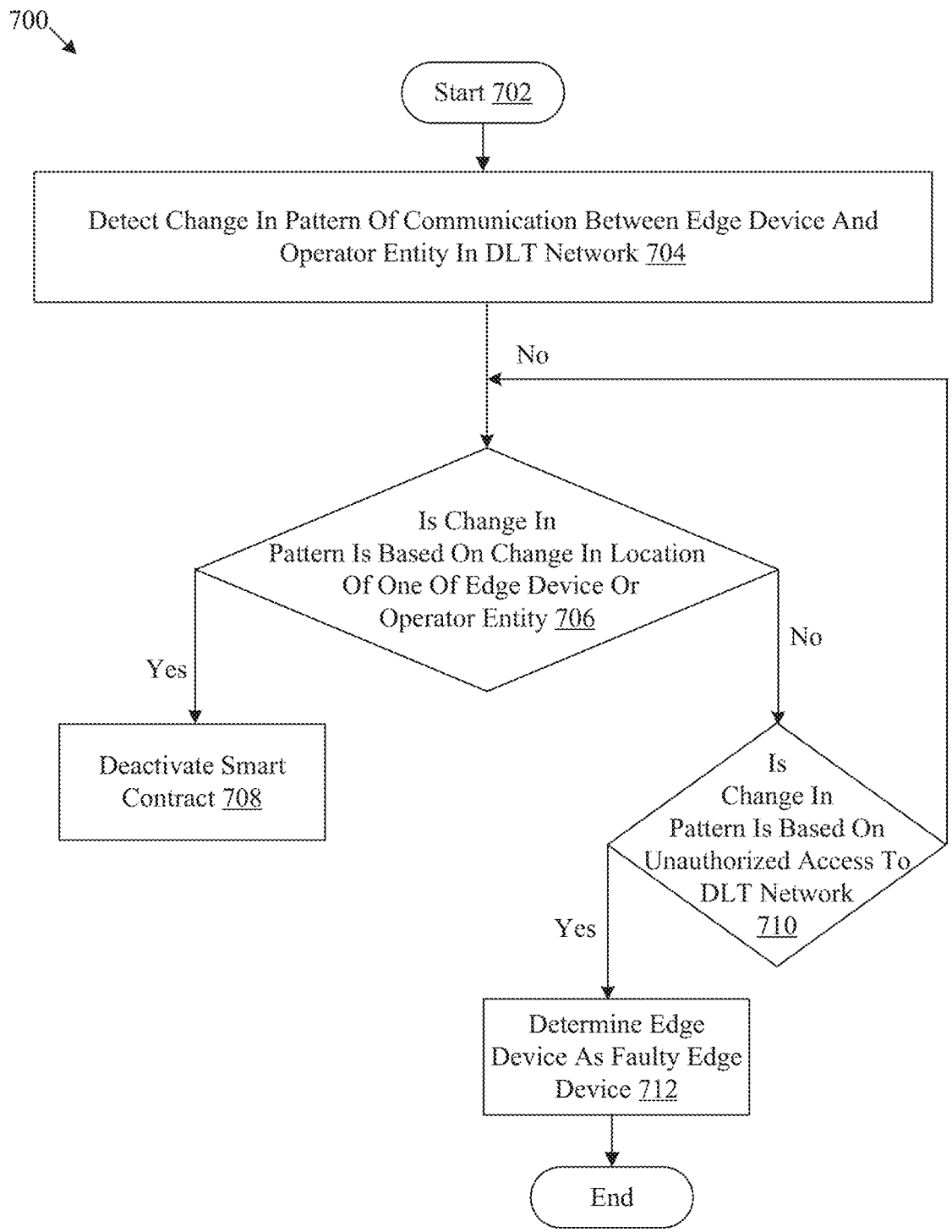
FIG. 7 illustrates an exemplary flowchart of a method for vulnerability detection, based on change in pattern in communication between an edge device and a DLT network, in accordance with an embodiment of the disclosure.

FIG. 7 illustrates an exemplary flowchart of a method for vulnerability detection, based on change in pattern in communication between an edge device and a DLT network, in accordance with an embodiment of the disclosure. FIG. 7 is described in conjunction with elements from FIGS. 1-4, 5A-5D, and 6. With reference to FIG. 7, there is shown a flowchart 700. The exemplary method of the flowchart 700 may be executed by any computing system, for example, by the system 102 of FIG. 1 or the circuitry 202 of FIG. 2. The exemplary method of the flowchart 700 may start at 702 and proceed to 704.

At 704, a change in a pattern of the communication between the edge device 106 and the operator entity in the DLT network 110 may be detected. In accordance with an embodiment, the circuitry 202 may be configured to detect the change in the pattern of the communication between the edge device 106 and the operator entity in the DLT network 110. The circuitry 202 may detect a vulnerability in the DLT network 110 based on changes in the pattern of the communication between the edge device 106 and the operator entity in the DLT network 110. In some embodiments, the AI model 104 may be trained to detect the change in the pattern of the communication between the edge device 106 and the operator entity in the DLT network 110.

At 706, a determination is made whether the change in the pattern is based on a change in a location of one of the edge device 106 or the operator entity (for example, the first operator entity 116A). In accordance with an embodiment, the circuitry 202 may determine whether the change in pattern is based on the change in the location of one of the edge device 106 or the operator entity. In an embodiment, the location of the edge device 106 may be changed due to the change in the location of the user 108.

At 708, the smart contract 120 may be deactivated, based on the detection that the change in the pattern is based on the change in the location of one of the edge device 106 or the operator entity. In accordance with an embodiment, the circuitry 202 may be configured to deactivate the smart contract 120 based on the detection that the change in the pattern is based on the change in the location of one of the edge device 106 or the operator entity.

At 710, a determination may be made whether the change in the pattern is based on an unauthorized access to the DLT network 110. In accordance with an embodiment, the circuitry 202 may determine whether the change in the pattern is based on the unauthorized access to the DLT network 110. For example, the unauthorized access may correspond to access by a malicious entity.

At 712, the edge device 106 may be determined as a faulty edge, in a case where the change in the pattern is based on the unauthorized access to the DLT network 110. In accordance with an embodiment, the circuitry 202 may be configured to determine the edge device 106 as the faulty edge device, based on the determination that the change in the pattern may be based on the unauthorized access to the DLT network 110. The faulty edge device may have been attacked by an intruder and may be a cause of the vulnerability. Based on the detection of the faulty edge device, the circuitry 202 may be discover another device, such as, a load balancing device for replacement of the faulty edge device. Control may pass to end.

In an embodiment, the circuitry 202 may further perform DLT down streaming using the AI model 104 to check for any potential vulnerability in the DLT network 110. The circuitry 202 may perform user behavior analytics to track activities associated with the user 108. For example, the user behavior analytics may allow the tracking of the activities, such as applications launched on the edge device 106, network activity of the edge device 106, access to critical files (such as emails), and frequency of access of the critical files. The user behavior analytics may allow detection of an unusual or anomalous activity on the edge device 106, and isolate the edge device 106 from the DLT network 110 to minimize damage.

Although the flowchart 700 is illustrated as discrete operations, such as 704, 706, 708, 710 and 712, the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 8A:
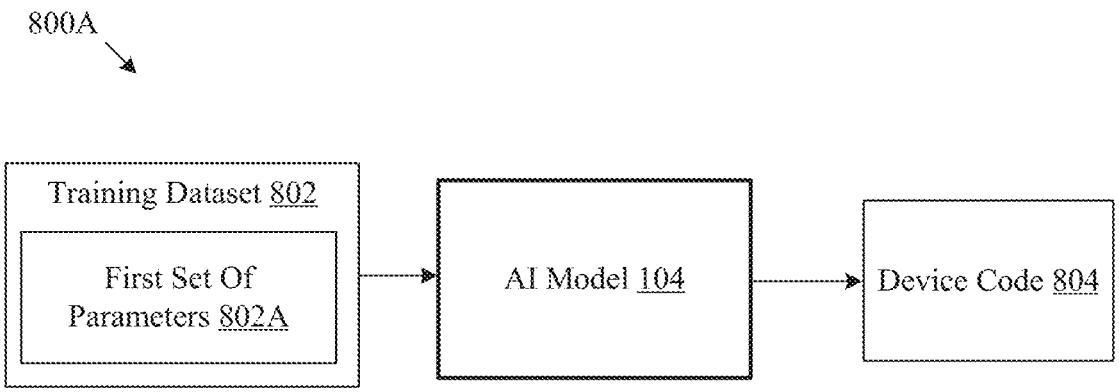
FIGS. 8A and 8B are diagrams that collectively illustrate training of an AI model for generation of a device code and a smart contract, in accordance with an embodiment of the disclosure.

FIG. 8A is a diagram that illustrates training of an AI model for generation of a device code, in accordance with an embodiment of the disclosure. FIG. 8A is described in conjunction with elements from FIGS. 1-4, 5A-5D, 6, and 7. With reference to FIG. 8A, there is shown a block diagram 800A. In the block diagram 800A, there is shown a training dataset 802 as input, the AI model 104, and the device code 804 as output.

In an embodiment, the training dataset 802 may include a first set of parameters 802A. In accordance with an embodiment, the circuitry 202 may be configured to train the AI model 104 on the first set of parameters to generate the device code 804. The first set of parameters 802A may include at least one of the sensor data associated with the edge device 106, user-specific data associated with the user 108, data associated with specifications of the edge device 106, and data related to the type of the DLT network 110. The circuitry 202 may train the AI model 104 to generate the device code 804. For example, the device code may include the IoT physical device code or the IoT virtual device code associated with edge device 106. The first set of parameters 802A may be input to the AI model 104, and the device code 804 may be the output of the AI model 104. In an example, the AI model 104 may be trained to generate the device code 804 until a prediction score of the AI model 104 may be more than a defined threshold. The circuitry 202 may evaluate the prediction score to iteratively train the AI model 104.

Figure 8B:
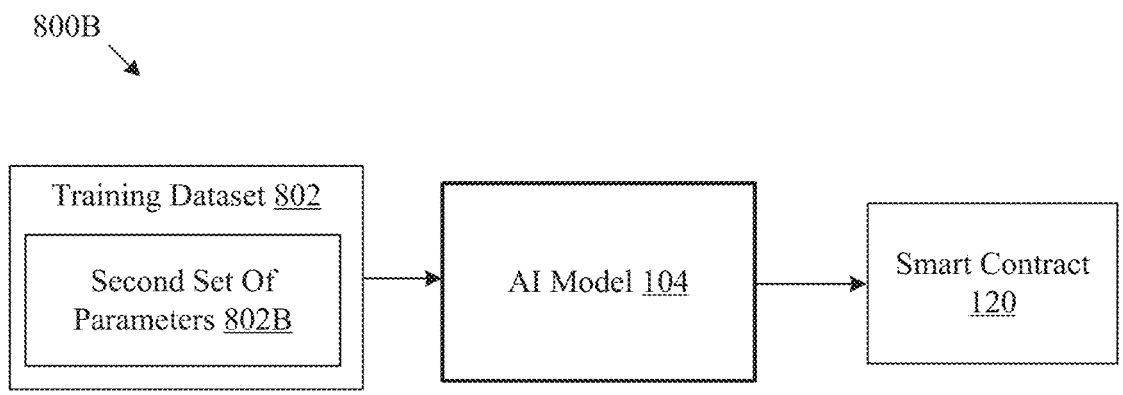

FIG. 8B is a diagram that illustrates training of an AI model for generation of a smart contract, in accordance with an embodiment of the disclosure. FIG. 8B is described in conjunction with elements from FIGS. 1-4, 5A-5D, 6, 7, and 8A. With reference to FIG. 8B, there is shown a block diagram 800B. In the block diagram 800B, there is shown the training dataset 802 as input, the AI model 104, and the smart contract 120 as output.

The training dataset 802 may further include a second set of parameters 802B. The circuitry 202 may be further configured to train the AI model 104 for the generation of the smart contract 120 based on the second set of parameters 802B. In some embodiments, the second set of parameters 802B may include the data associated with the edge device 106 and the DLT network 110. In one or more embodiments, the second set of parameters 802B may be a part of the first set of parameters 802A. In an example, the AI model 104 may be trained to generate the smart contract 120 until a prediction score of the AI model 104 may be more than a defined threshold. The circuitry 202 may evaluate the prediction score to iteratively train the AI model 104. In some embodiments, the AI model 104 may include a first AI model and a second AI model. The circuitry 202 may train the first AI model to generate the device code 804 and train the second AI model to generate the smart contract 120. The system 102 may select a respective AI model, such as, the first AI model for the generation of the device code 804 and the second AI model for the generation of the smart contract 120 based on the requirements of each use case.

Figure 9B:
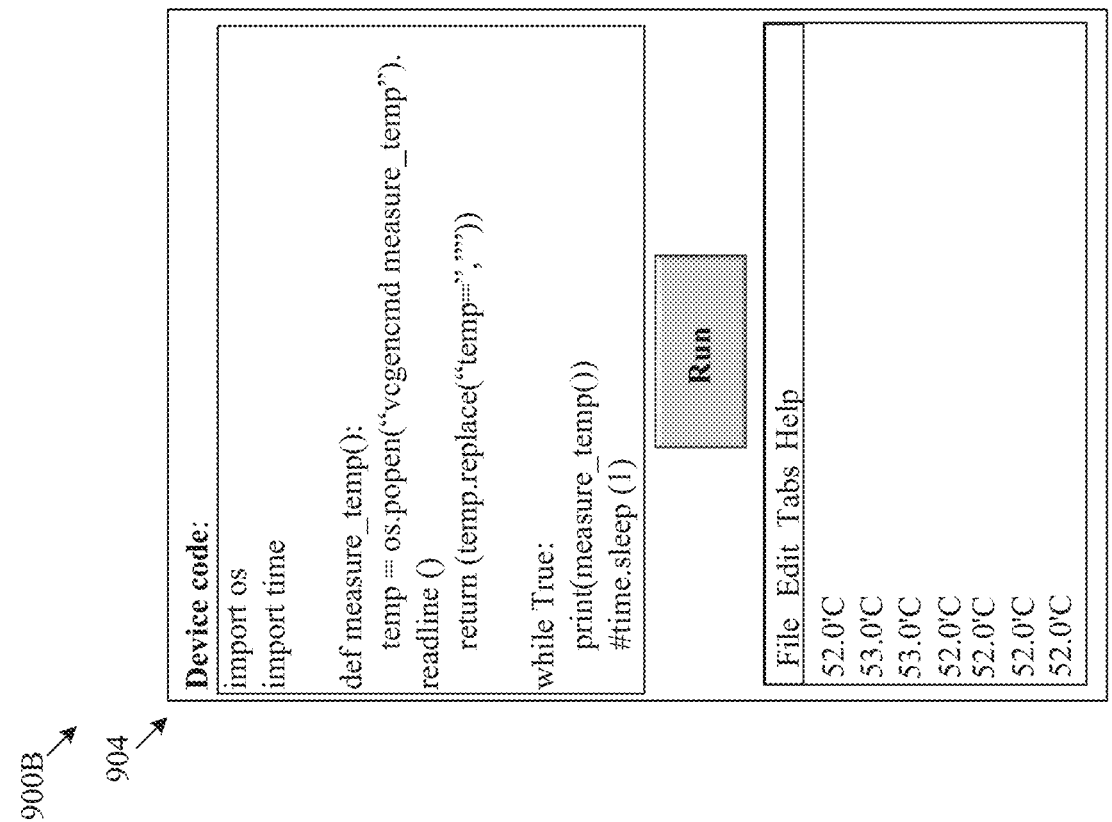
Figure 9A:
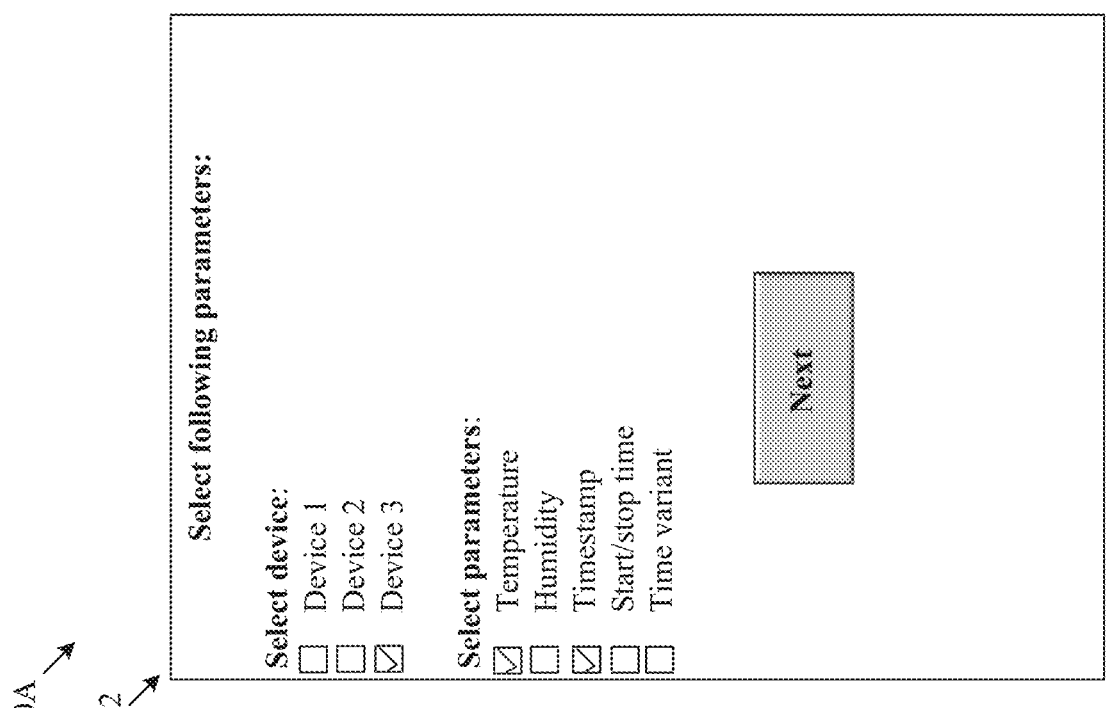

FIG. 9A is a diagram that illustrates a user interface for generation of a smart contract in a DLT network, in accordance with an embodiment of the disclosure. FIG. 9A is described in conjunction with elements from FIGS. 1-4, 5A-5D, 6, 7, 8A, and 8B. With reference to FIG. 9A, there is shown an exemplary scenario 900A. In the exemplary scenario 900A, there is shown a user interface 902 that may be generated by the frontend 118 for display on a device associated with the operator entity (such as the first operator entity 116A) or the edge device 106.

In the exemplary scenario 900A, the circuitry 202 may generate the user interface 902 for the selection of parameters, such as, selection of device type among device 1 (BME280), device 2 (Raspberry pi3), or device 3 (Raspberry pi4), and selection of sensor data for generation of the device code. For example, as shown in FIG. 9A, "device 3" may be selected as the device type, and "temperature" and "timestamp" may be selected as the sensor data. The selection of these parameters may depend on the use case, such as, a service associated with the medical facility, or a service associated with the MaaS system. Upon selection, the circuitry 202 may receive the user input to move to the next user interface screen via the "Next" button. The circuitry 202 may generate the user interface shown in FIG. 9B.

FIG. 9B is a diagram that illustrates a user interface for generation of a smart contract in a DLT network, in accordance with an embodiment of the disclosure. FIG. 9B is described in conjunction with elements from FIGS. 1-4, 5A-5D, 6, 7, 8A, 8B, and 9A. With reference to FIG. 9B, there is shown an exemplary scenario 900B. In the exemplary scenario 900B, there is shown a user interface 904 that may be generated by the frontend 118 for display on a device associated with the operator entity (such as the first operator entity 116A) or the edge device 106.

In the exemplary scenario 900B, the circuitry 202 may generate the user interface 904 for display of a preview of the device code generated based on the parameters selected in the user interface 902. Based on the preview, the circuitry 202 may control test execution of the device code in response to reception of user input via the "Run" button. Upon the test execution, the circuitry 202 may generate the user interface shown in FIG. 9C.

FIG. 9C is a diagram that illustrates a user interface for generation of a smart contract in a DLT network, in accordance with an embodiment of the disclosure. FIG. 9A is described in conjunction with elements from FIGS. 1-4, 5A-5D, 6, 7, 8A, 8B, 9A, and 9B. With reference to FIG. 9C, there is shown an exemplary scenario 900C. In the exemplary scenario 900C, there is shown a user interface 906 that may be generated by the frontend 118 for display on a device associated with the operator entity (such as the first operator entity 116A) or the edge device 106.

In the exemplary scenario 900C, the circuitry 202 may generate the user interface 906 for the selection of IoT contract data to be pushed to the DLT network 110. For example, as shown in FIG. 9C, "device 3 sensor for temperature" may be selected as the contract data to be pushed to the DLT network 110. Upon selection, the circuitry 202 may receive the user input to move to the next user interface screen via the "Next" button. The circuitry 202 may generate the user interface shown in FIG. 9D.

FIG. 9D is a diagram that illustrates a user interface for generation of a smart contract in a DLT network, in accordance with an embodiment of the disclosure. FIG. 9D is described in conjunction with elements from FIGS. 1-4, 5A-5D, 6, 7, 8A, 8B, 9A, 9B, and 9C. With reference to FIG. 9D, there is shown an exemplary scenario 900D. In the exemplary scenario 900D, there is shown a user interface 908 that may be generated by the frontend 118 for display on a device associated with the operator entity (such as the first operator entity 116A) or the edge device 106.

In the exemplary scenario 900D, the circuitry 202 may generate the user interface 908 for the selection of the type of the DLT network 110 based on one or more suggestions regarding the cost of deployment. For example, as shown in FIG. 9D, the user interface 906 may display the suggestion that no cost is incurred to deploy the smart contract 120 on a private DLT network (for example, Hyperledger®). In another example, as shown in FIG. 9D, the user interface 906 may display that the gas price and/or Ethers are required to deploy the smart contract 120 on a public DLT network (for example, Ethereum®). The user interface 908 may display other suggestions for the selection of the type of the DLT network 110 based on other factors (for example, mode of payment for service, scalability, privacy, cost for silo mode and resume mode, etc.). Upon selection of the type of the DLT network 110, the circuitry 202 may receive the user input to move to the next user interface screen via the "Next" button. The circuitry 202 may generate the user interface shown in FIG. 9E.

FIG. 9E is a diagram that illustrates a user interface for generation of a smart contract in a DLT network, in accordance with an embodiment of the disclosure. FIG. 9E is described in conjunction with elements from FIGS. 1-4, 5A-5D, 6, 7, 8A, 8B, and 9A-9D. With reference to FIG. 9E, there is shown an exemplary scenario 900E. In the exemplary scenario 900E, there is shown a user interface 910 that may be generated by the frontend 118 for display on a device associated with the operator entity (such as the first operator entity 116A) or the edge device 106.

In the exemplary scenario 900E, the circuitry 202 may generate the user interface 910 for the selection of a type of smart contract 120 with options such as "Normal contract", "Fungible" having support for fungible features, and "Non-Fungible" having support for non-fungible tokens. Upon selection of the type of the smart contract 120 (such as the "Normal" type), the circuitry 202 may receive the user input to move to the next user interface screen via the "Next" button. The circuitry 202 may generate the user interface shown in FIG. 9F.

FIG. 9F is a diagram that illustrates a user interface for generation of a smart contract in a DLT network, in accordance with an embodiment of the disclosure. FIG. 9A is described in conjunction with elements from FIGS. 1-4, 5A-5D, 6, 7, 8A, 8B, and 9A-9E. With reference to FIG. 9F, there is shown an exemplary scenario 900F. In the exemplary scenario 900F, there is shown a user interface 912 that may be generated by the frontend 118 for display on a device associated with the operator entity (such as the first operator entity 116A) or the edge device 106.

In the exemplary scenario 900F, the circuitry 202 may generate the user interface 912 for the selection of the parameters for the smart contract 120. For example, as shown in FIG. 9F, "order ID", "temperature", "device type", and "username" may be selected as the parameters for the smart contract 120. The selection of these parameters may depend on the use case, such as, the service associated with the medical facility, or the service associated with the MaaS system. For example, other parameters such as "address" and "song preference" may be displayed in a case where a cab service associated with the MaaS system has been requested. These parameters may be selected for a seamless service across multiple operators. Upon selection, the circuitry 202 may receive the user input to move to the next user interface screen via the "Create Smart Contract" button. The circuitry 202 may generate the user interface shown in FIG. 9G.

FIG. 9G is a diagram that illustrates a user interface for generation of a smart contract in a DLT network, in accordance with an embodiment of the disclosure. FIG. 9G is described in conjunction with elements from FIGS. 1-4, 5A-5D, 6, 7, 8A, 8B, and 9A-9F. With reference to FIG. 9G, there is shown an exemplary scenario 900G. In the exemplary scenario 900G, there is shown a user interface 914 that may be generated by the frontend 118 for display on a device associated with the operator entity (such as the first operator entity 116A) or the edge device 106.

In the exemplary scenario 900G, the circuitry 202 may generate the user interface 914 for display of a preview of the chain code associated with generated smart contract 120. Based on the preview, the circuitry 202 may control deployment of the smart contract 120 on the DLT network 110 in response to reception of user input via the "Deploy on network" button. Upon the deployment, the circuitry 202 may enable communication between the edge device 106 and the operator entity (such as the first operator entity 116A, and create a transaction record on the DLT network 110 based on the communication.

Figures 10A, 10B:
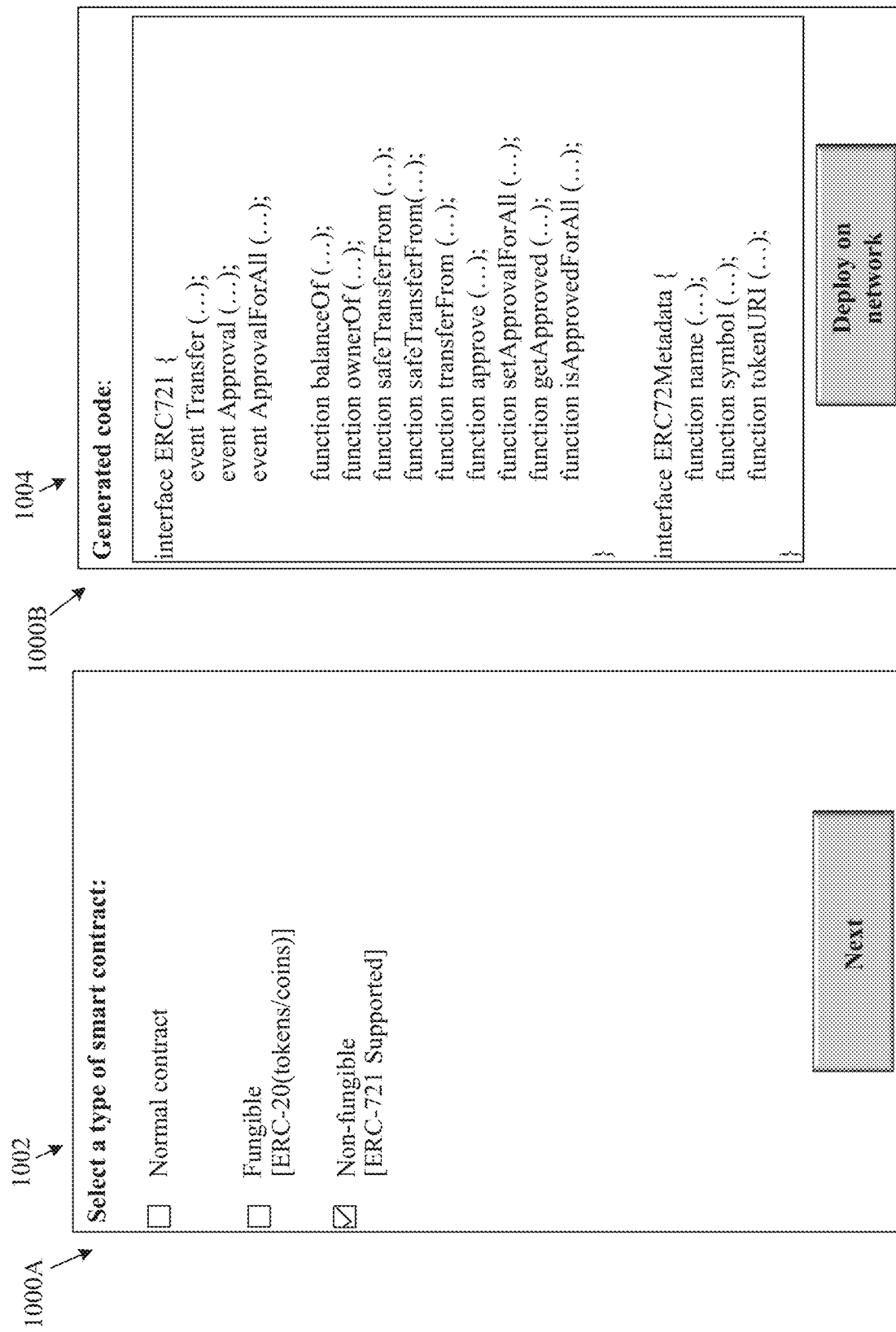

FIGS. 10A and 10B are diagrams that collectively illustrate user interfaces for generation of a smart contract in a DLT network with support for non-fungible tokens, in accordance with an embodiment of the disclosure. FIGS. 10A and 10B are described in conjunction with elements from FIGS. 1-4, 5A-5D, 6, 7, 8A, 8B, and 9A-9G.

In accordance with an embodiment, the circuitry 202 may generate IoT smart contracts with support for non-fungible tokens in case of IoT & DLT network interoperability within homogenous and heterogenous environments. A non-fungible token (NFT) may be used to represent any digital identity and thus may ensure any kind of associated asset protection. The system 102 may support NFT representation of assets, and may generate automatic IoT contracts and smart contracts similar to non-NFT features of the system 102. The system 102 may also support NFT feature for homogenous (for example, Ethereum®-Ethereum®) and heterogenous (for example, Ethereum® and Hyperledger®) ecosystems. NFTs may include tokens that represent digital data of devices, music, image, game data, digital art, house/property, precious gems such as diamonds, and so on. In an embodiment, the NFTs may be created using the ERC-721 standard. The system 102 may also support ERC-20 tokens that are fungible tokens, which may be used to represent blockchain-based assets that have value associated with them. The NFTs may be sent and received similar to non-NFT tokens.

With reference to FIG. 10A, there is shown an exemplary scenario 1000A. In the exemplary scenario 1000A, there is shown a user interface 1002 that may be generated by the frontend 118 for display on a device associated with the operator entity (such as the first operator entity 116A) or the edge device 106. In the exemplary scenario 1000A, which is an alternative to the exemplary scenario 900E, the circuitry 202 may generate the user interface 1002 for the selection of a type of smart contract 120 with options such as "Normal contract", "Fungible" having support for fungible tokens according to ERC-20 standard, and "Non-Fungible" having support for non-fungible tokens according to ERC-721 standard. Upon selection of the type of the smart contract 120 (such as "Non-Fungible" type), the circuitry 202 may receive the user input to move to the next user interface screen via the "Next" button. The circuitry 202 may generate the user interface shown in FIG. 10B.

With reference to FIG. 10B, there is shown an exemplary scenario 1000B. In the exemplary scenario 1000B, there is shown a user interface 1004 that may be generated by the frontend 118 for display on a device associated with the operator entity (such as the first operator entity 116A) or the edge device 106. In the exemplary scenario 1000B, the circuitry 202 may generate the user interface 1004 for display of a preview of the chain code associated with generated smart contract 120 with support for NFTs. Based on the preview, the circuitry 202 may control deployment of the smart contract 120 on the DLT network 110 in response to reception of user input via the "Deploy on network" button.

FIGS. 10C and 10D are diagrams that collectively illustrate user interfaces for generation of a smart contract in a DLT network with support for fungible tokens, in accordance with an embodiment of the disclosure. FIGS. 10C and 10D are described in conjunction with elements from FIGS. 1-4, 5A-5D, 6, 7, 8A, 8B, 9A-9G, 10A, and 10B.

With reference to FIG. 10C, there is shown an exemplary scenario 1000C. In the exemplary scenario 1000C, there is shown a user interface 1006 that may be generated by the frontend 118 for display on a device associated with the operator entity (such as the first operator entity 116A) or the edge device 106. In the exemplary scenario 1000C, which is an alternative to the exemplary scenario 900E and the exemplary scenario 1000A, the circuitry 202 may generate the user interface 1006 for the selection of the type of smart contract 120 with options such as "Normal contract", "Fungible" having support for fungible tokens according to ERC-20 standard, and "Non-Fungible" having support for non-fungible tokens according to ERC-721 standard. Upon selection of the type of the smart contract 120 (such as "Fungible" type), the circuitry 202 may receive the user input to move to the next user interface screen via the "Next" button. The circuitry 202 may generate the user interface shown in FIG. 10D.

With reference to FIG. 10D, there is shown an exemplary scenario 1000D. In the exemplary scenario 1000D, there is shown a user interface 1008 that may be generated by the frontend 118 for display on a device associated with the operator entity (such as the first operator entity 116A) or the edge device 106. In the exemplary scenario 1000D, the circuitry 202 may generate the user interface 1008 for display of a preview of the chain code associated with generated smart contract 120 with support for fungible tokens. Based on the preview, the circuitry 202 may control deployment of the smart contract 120 on the DLT network 110 in response to reception of user input via the "Deploy on network" button.

Figure 11:
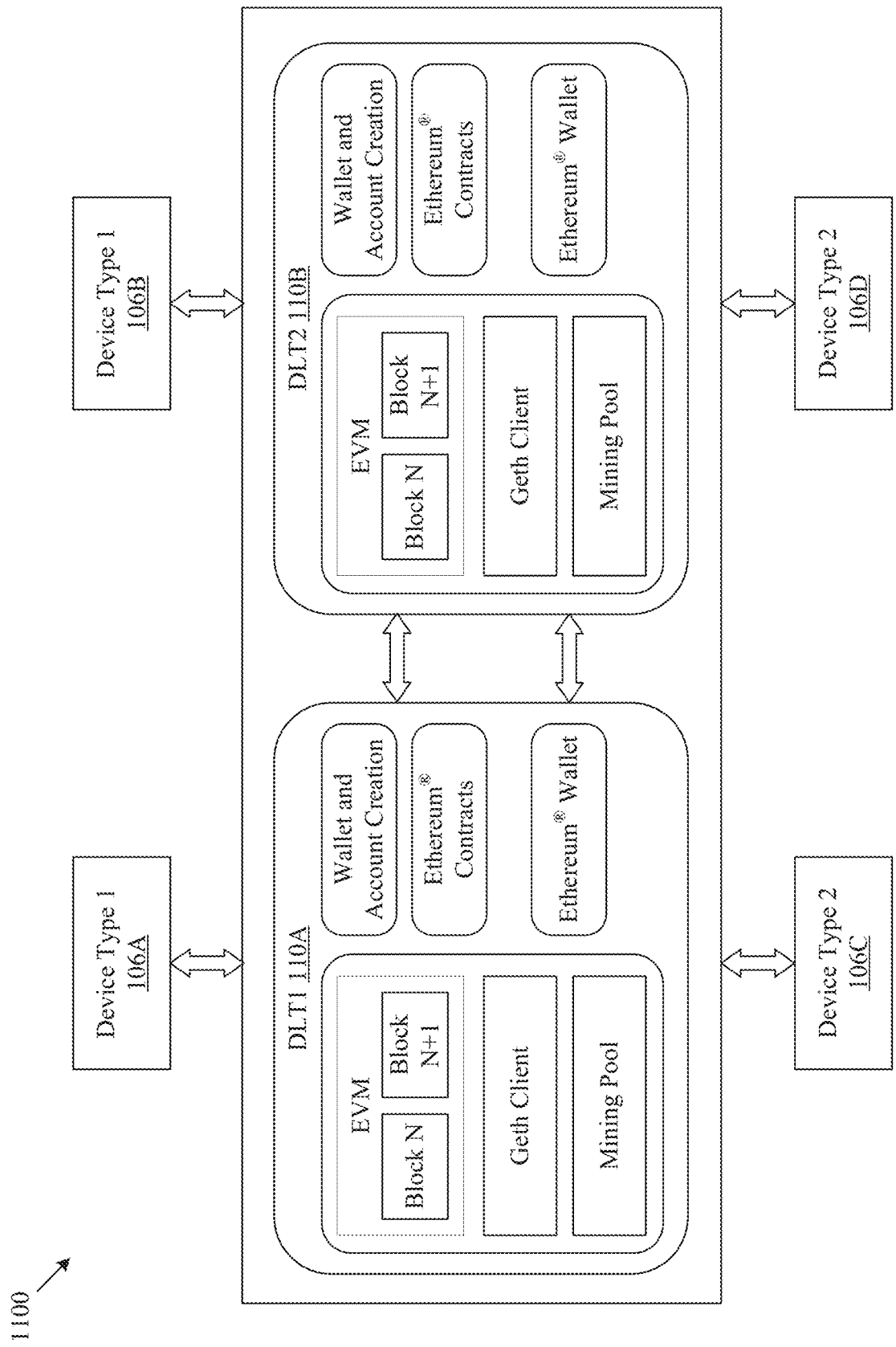
FIG. 11 is a diagram of an exemplary environment that illustrates IoT interoperability with homogeneous and heterogeneous device configurations, in accordance with an embodiment of the disclosure.

FIG. 11 is a diagram of an exemplary environment that illustrates IoT interoperability with homogeneous and heterogeneous device configurations, in accordance with an embodiment of the disclosure. FIG. 11 is described in conjunction with elements from FIGS. 1-4, 5A-5D, 6, 7, 8A, 8B, 9A-9G, and 10A-10D. With reference to FIG. 11, there is shown an exemplary scenario 1100. In the exemplary scenario 1100, there are shown a first DLT network 110A (e.g. Ethereum®), a second DLT network 110B (e.g. Ethereum®), a first IoT device 106A of device type 1, a second IoT device 106B of device type 1, a third IoT device 106C of device type 2, and a fourth IoT device 106D of device type 2. In an example, device type 1 may be Raspberry Pi®, and device type 2 may be Jetson®.

In the exemplary scenario 1100, the first DLT network 110A and the second DLT network 110B may be the same type of distributed ledger or may have similar configurations. In a first interoperability use case scenario, the system 102 may enable interoperability with the IoT devices of the same configuration or type (e.g. device type 1 to device type 1 or device type 2 to device type 2) in the same type of distributed ledger. In a second interoperability use case scenario, the system 102 may enable interoperability with the IoT devices of different configurations or types (e.g. device type 1 to device type 2) in the same type of distributed ledger.

Figure 12A:
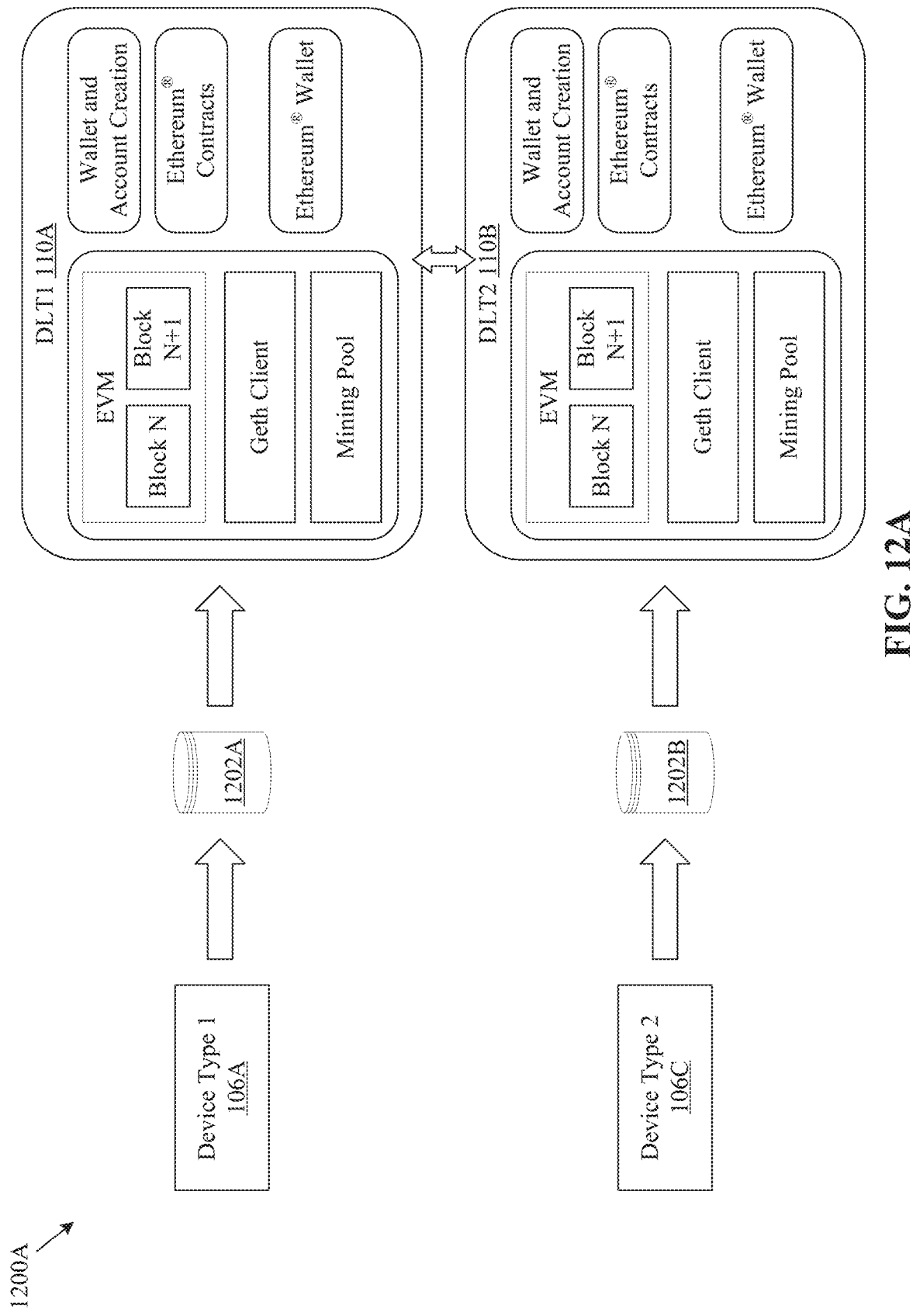
FIG. 12A is a diagram of an exemplary environment that illustrates exchange of data from IoT devices with the DLT networks using the system, in accordance with an embodiment of the disclosure.

FIG. 12A is a diagram of an exemplary environment that illustrates exchange of data from IoT devices with the DLT networks using the system, in accordance with an embodiment of the disclosure. FIG. 12A is described in conjunction with elements from FIGS. 1-4, 5A-5D, 6, 7, 8A, 8B, 9A-9G, 10A-10D, and 11. With reference to FIG. 12A, there is shown an exemplary scenario 1200A. In the exemplary scenario 1200A, there are shown a first DLT network 110A (e.g. Ethereum®), a second DLT network 110B (e.g. Ethereum®), a first IoT device 106A of device type 1, a second IoT device 106C of device type 2, a first external database 1202A, and a second external database 1202B. In an example, the first external database 1202A and the second external database 1202B may be based on decentralized web (e.g. InterPlanetary File System (IPFS) protocol, ZeroNet, etc.). The first DLT network 110A and the second DLT network 110B may support an Ethereum® wallet to store a record of wallet amount and rewards earned. The first DLT network 110A and the second DLT network 110B may be each associated with a virtual machine (EVM), Geth client, a mining pool, a wallet and account creation module, and the smart contracts 120.

In the exemplary scenario 1200A, the system 102 may control storage of data from the first IoT device 106A (e.g. a Raspberry Pi device) via the first external database 1202A. For example, the first external database 1202A may receive and store 600 responses in an hour (1 response*10 sec*60 mins=600 responses) from the first IoT device 106A. In another example, the first external database 1202A may receive and store 86400 responses in a day (600 responses*12 hours (day)*12 hours (night)=86,400 responses). The first external database 1202A may then push a hash of all responses combined for the day into the blockchain (e.g. first DLT network 110A). In another example, the storage of data from the first IoT device 106A via the first external database 1202A may be optional.

In another example, the system 102 may further control storage of data from the second IoT device 106C (e.g. a Jetson device) via the second external database 1202B. For example, the second external database 1202B may receive and store 600 responses in an hour (1 response*10 sec*60 mins=600 responses) from the second IoT device 106C. In another example, the second external database 1202B may receive and store 86400 responses in a day (600 responses*12 hours (day)*12 hours (night)=86,400 responses). The second external database 1202B may then push a hash of all responses combined for the day into the blockchain (e.g. second DLT network 110B). In another example, the storage of data from the second IoT device 106C via the second external database 1202B may be optional.

Figure 12B:
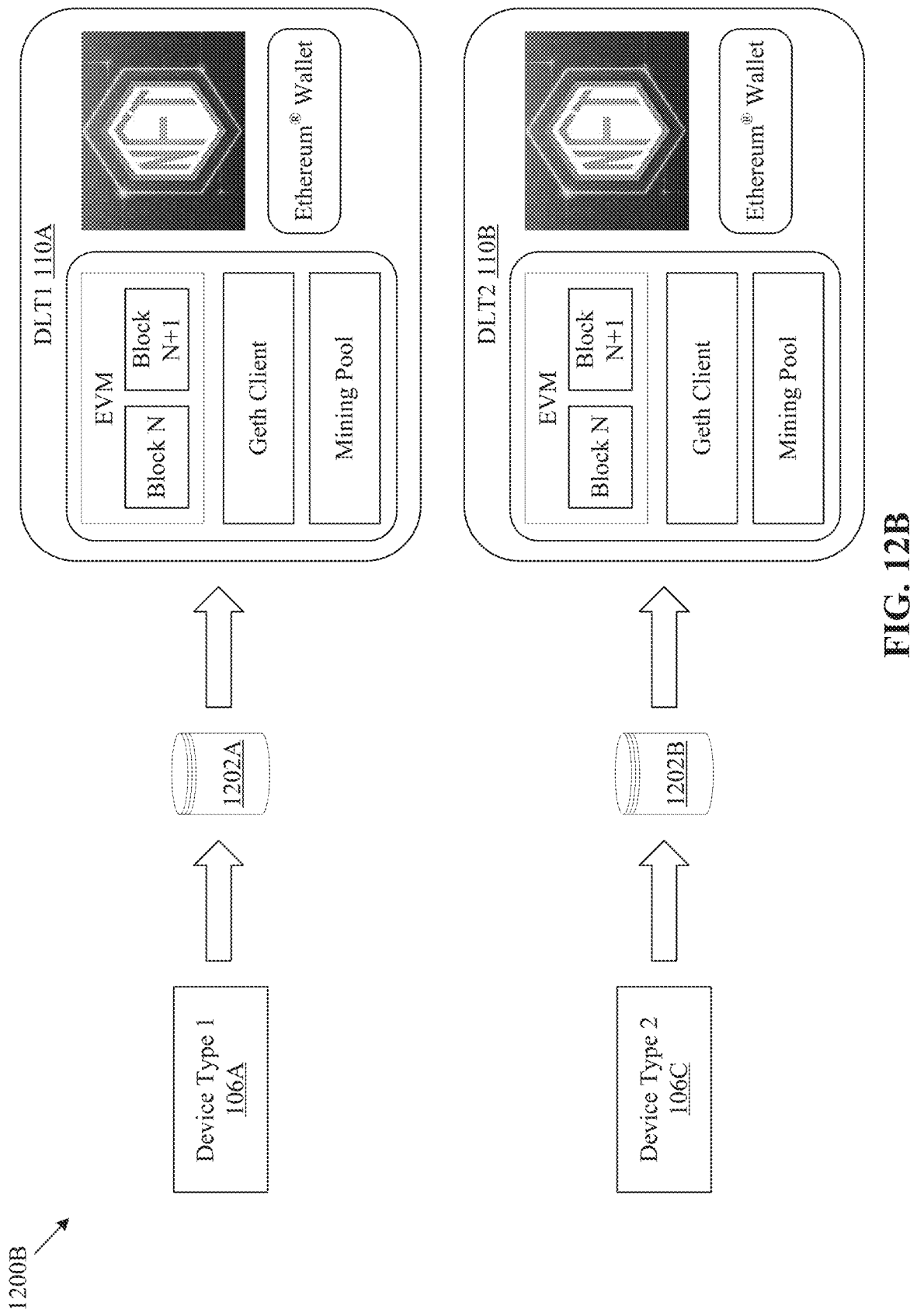
FIG. 12B is a diagram of an exemplary environment that illustrates exchange of data from IoT devices with the DLT networks using the NFT feature of the system, in accordance with an embodiment of the disclosure.

FIG. 12B is a diagram of an exemplary environment that illustrates exchange of data from IoT devices with the DLT networks using the NFT feature of the system, in accordance with an embodiment of the disclosure. FIG. 12B is described in conjunction with elements from FIGS. 1-4, 5A-5D, 6, 7, 8A, 8B, 9A-9G, 10A-10D, 11, and 12A. With reference to FIG. 12B, there is shown an exemplary scenario 1200B. In the exemplary scenario 1200B, there are shown a first DLT network 110A (e.g. Ethereum®), a second DLT network 110B (e.g. Ethereum®), a first IoT device 106A of device type 1, a second IoT device 106C of device type 2, a first external database 1202A, and a second external database 1202B. In an example, the first external database 1202A and the second external database 1202B may be based on decentralized web (e.g. InterPlanetary File System (IPFS), ZeroNet, etc.). In an embodiment, the first DLT network 110A and the second DLT network 110B may support non-fungible tokens (NFTs).

In the exemplary scenario 1200B, the system 102 may control storage of data from the first IoT device 106A (e.g. a Raspberry Pi device) via the first external database 1202A. For example, the first external database 1202A may receive and store 600 responses in an hour (1 response*10 sec*60 mins=600 responses) from the first IoT device 106A. In another example, the first external database 1202A may receive and store 86400 responses in a day (600 responses*12 hours (day)*12 hours (night)=86,400 responses). The first external database 1202A may then push a hash of all responses combined for the day into blockchain (e.g. first DLT network 110A). In another example, the system 102 may further control storage of data from the second IoT device 106C (e.g. a Jetson device) via the second external database 1202B in a similar manner. In the exemplary scenario 1200B, the storage of data from the second IoT device 106C via the second external database 1202B may be preferable.

In an embodiment, the system 102 may utilize NFT to add advantage in a case where data is unique, or image or video has some rare feature. The preservation of data as unique ID may be performed via a key value pair and may change in various blockchains. Using NFT, the system 102 may employ unique token ID, and the data may have values based on uniqueness and market trend. Once NFT for a unique ID is created, the system 102 may control saving of data from the first IoT device 106A (e.g. a Raspberry Pi device) to the first external database 1202A (e.g. IPFS, ZeroNet, etc.), and may control creation of an NFT URI based on hash. This may further be sold to other users and the data may be harvested based on requirement. For example, NFT may be sold for the device data, and the device data may be bought by another entity. Further, uniqueness may be added to the NFT URI by including device data.

In an example use case scenario of a shopping mall, whenever a user shops at different brands, reward points (e.g. loyalty coins, gift cards, or offers) are provided to build customer relation and attract customers to shop again. The reward points may also be provided as loyalty bonus. The reward points may be utilized next time for obtaining discount on the next purchase. Currently, the user must purchase from the same shop to obtain discount by redeeming reward points/loyalty points. The reward points cannot be normalized since different platforms (public and private blockchains) may have different parameters for assigning reward points and their valuation. The system 102 utilizes NFT to provide a unified way of using reward points even at different shops and obtain discounts on the next purchase. Using NFT, the system 102 may allow the user to utilize the reward points received in the form of NFTs in one use case (e.g. shopping mall) for redeeming in other use cases (such as Hospital or Fastest route use cases). The value of the NFTs may be based on market trends and may increase as NFT gains value.

Figure 13:
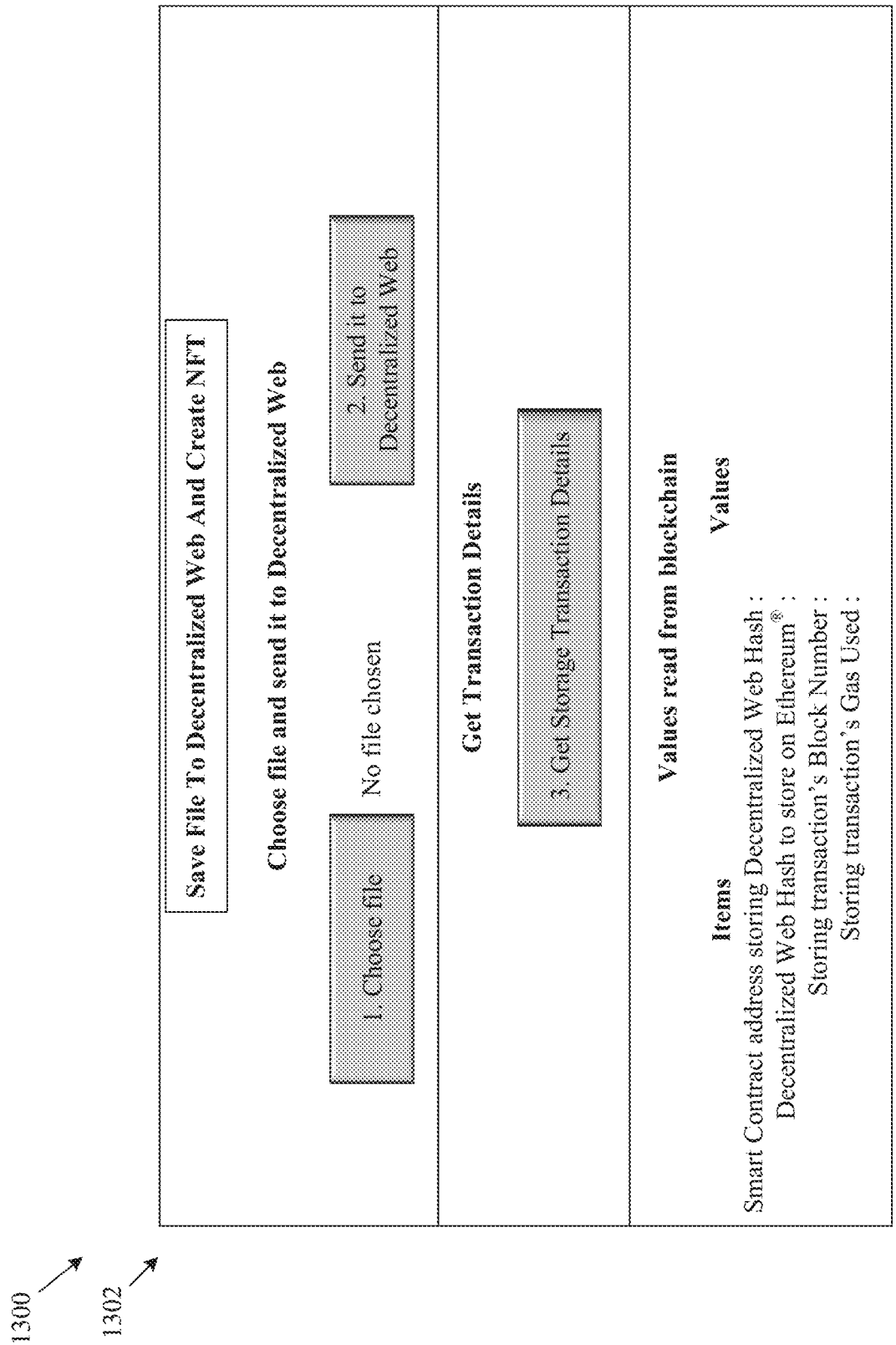
FIG. 13 is a diagram that illustrates a user interface for transferring data to an external database for NFT generation, in accordance with an embodiment of the disclosure.

FIG. 13 is a diagram that illustrates a user interface for transferring data to an external database for NFT generation, in accordance with an embodiment of the disclosure. FIG. 13 is described in conjunction with elements from FIGS. 1-4, 5A-5D, 6, 7, 8A, 8B, 9A-9G, 10A-10D, 11, 12A, and 12B. With reference to FIG. 13, there is shown an exemplary scenario 1300. In the exemplary scenario 1300, there is shown a user interface 1302 that may be generated by the frontend 118 for display on a device associated with the operator entity (such as the first operator entity 116A) or the edge device 106. In an example, the external database (such as the first external database 1202A or the second external database 1202B) may be based on decentralized web (e.g. InterPlanetary File System (IPFS), ZeroNet, etc.).

In the exemplary scenario 1300, the circuitry 202 may generate the user interface 1302 for the selection of the file for transfer to the decentralized web via the button "Choose file". Upon selection, the user interface 1302 may receive user input to transfer the file to the decentralized web via the button "Send it to decentralized web". Upon transfer, the user interface 1302 may receive user input to view the transaction details via the button "Get Storage Transaction Details". The values of items read from the blockchain (e.g. DLT network 110) based on the transaction may be displayed on the user interface 1302. The items relevant to the transaction may include "Smart Contract address storing decentralized web hash", "decentralized web hash to store on Ethereum®", "Storing transaction's Block Number", "Storing transaction's Gas Used", and so on.

The following code illustrates the minting of the NFT:
truffle (develop)>await nft.mint ("0x04 . . . ")
{
tx: '0x53 . . . ',
receipt: {
  transactionHash: "0x53 . . . ',
  transaction Index: 0,
  blockHash: '0x87 . . . ',
  blockNumber: 5,
  from: '0x2a . . . ',
  to: '0x40 . . . ',
  gasUsed: 115713,
  cumulativeGasUsed: 115713,
  contractAddress: null,
  logs: [[Object]],
  status: true,
  logsBloom: '0x00 . . . ',
  rawLogs: [[Object]]
}

The following code illustrates the transfer of the NFT to another account (ownership change to new account):
PuTTY (inactive)
  event: 'Transfer',
  args: [Result]
  }
]
}
truffle (develop)>await nft.ownerOf (0)
'0x04 . . . '
truffle (develop)>await nft.ownerOf (1)
'0x2a . . . '
truffle (develop)>await nft.safeTransferFrom ("0x2a . . . ", "0x7b . . . ", 1)
{
  tx: '0x61 . . . ',
  receipt: {
  transactionHash: "0x61 . . . ',
  transactionIndex: 0,
  blockHash: '0x3a . . . ',
  blockNumber: 7,
  from: '0x2a . . . ',
  to: '0x40 . . . ',
  gasUsed: 67020,
  cumulativeGasUsed: 67020,
  contractAddress: null,
  logs: [ [Object], [Object],
  status: true, logsBloom: '0x00 . . . ',
rawLogs: [ [Object], [Object] ]
} . . . .

FIG. 14 is a diagram that illustrates a user interface for generation of a normal smart contract for a specific use case, in accordance with an embodiment of the disclosure. FIG. 14 is described in conjunction with elements from FIGS. 1-4, 5A-5D, 6, 7, 8A, 8B, 9A-9G, 10A-10D, 11, 12A, 12B, and 13. With reference to FIG. 14, there is shown an exemplary scenario 1400. In the exemplary scenario 1400, there is shown a user interface 1402 that may be generated by the frontend 118 for display on a device associated with the operator entity (such as the first operator entity 116A) or the edge device 106.

In the exemplary scenario 1400, the circuitry 202 may generate the user interface 1402 for receiving user input to generate a normal (non-NFT) smart contract. The user interface 1402 may receive user input such as IP location for deploying the smart contract 120, the platform (e.g. Ethereum/Hyperledger), and the relevant use case (e.g. medical, shopping mall, etc.). The user interface 1402 may also receive the selection of the functions (such as Get, Post, etc.) that the user wishes to have in the smart contract 120. Upon entry of the user input and the selection, the user interface 1402 may receive user input to generate the smart contract via the button "Create Contract". In order to push the data onto the blockchain (e.g. DLT network 110), the user interface 1402 may prompt the user to select a device from among device 1 (e.g. Raspberry pi4) and device 2 (e.g. Jetson board). The user interface 1402 may further require the user to add order details such as "Order Id", "Username" and "Date" at the time of generation of the smart contract 120. In a case where the user wishes to add access data, the circuitry 202 provides the option using decentralized web (e.g. IPFS, ZeroNet, etc.). The user interface 1402 may allow the user to select the decentralized web option via the buttons "Choose file" and "Send to Decentralized Web". Upon selection of the decentralized web option, the data may be pushed to the decentralized web (e.g. IPFS, ZeroNet) and a hash may be pushed to the blockchain. Upon clicking the "submit" button on the user interface 1402, the transaction is successfully pushed to the blockchain.

Figure 15:
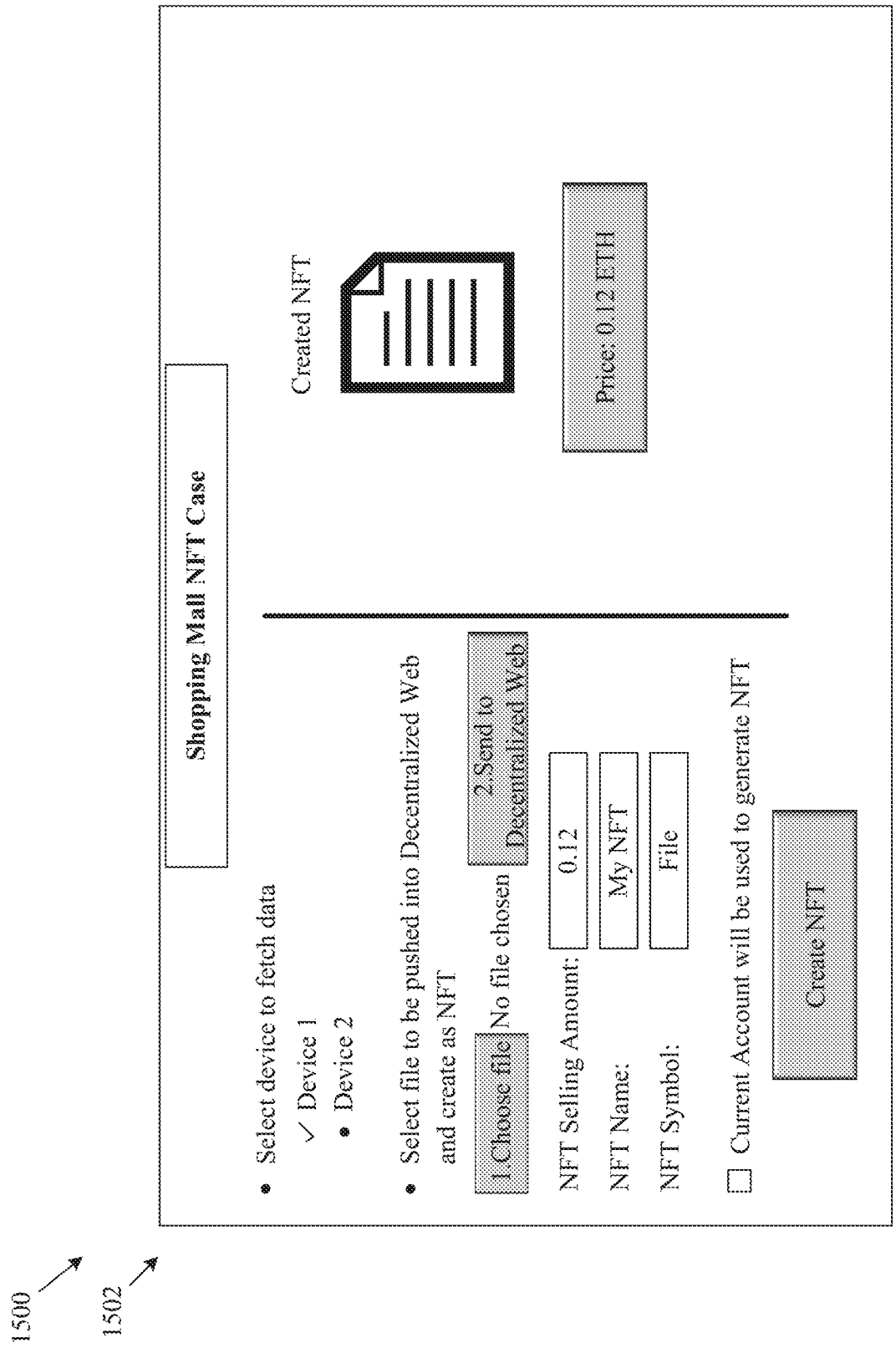
FIG. 15 is a diagram that illustrates a user interface for generation of a smart contract with NFT for a specific use case, in accordance with an embodiment of the disclosure.

FIG. 15 is a diagram that illustrates a user interface for generation of a smart contract with NFT for a specific use case, in accordance with an embodiment of the disclosure. FIG. 15 is described in conjunction with elements from FIGS. 1-4, 5A-5D, 6, 7, 8A, 8B, 9A-9G, 10A-10D, 11, 12A, 12B, 13, and 14. With reference to FIG. 15, there is shown an exemplary scenario 1500. In the exemplary scenario 1500, there is shown a user interface 1502 that may be generated by the frontend 118 for display on a device associated with the operator entity (such as the first operator entity 116A) or the edge device 106.

In the exemplary scenario 1500, the circuitry 202 may generate the user interface 1502 for receiving user input to generate an NFT enabled smart contract. The user interface 1502 may prompt the user to select a device from among device 1 (e.g. Raspberry pi4) and device 2 (e.g. Jetson board) for the data to be pushed onto the blockchain (e.g. DLT network 110). The user interface 1502 may receive selection of the file/image/video to generate an NFT using the decentralized web (e.g. IPFS, ZeroNet). The user interface 1502 may further require inputs such as NFT selling amount, NFT Name, and NFT symbol. The NFT selling amount may correspond to the amount at which NFT is available for selling. The NFT name and NFT symbol may be each associated with the NFT as a reference to the NFT.

Upon clicking the button "create NFT" on the user interface 1502, the transaction is successfully pushed to blockchain as an NFT. The user interface 1502 may display the generated NFT along with its selling price.

Figure 16:
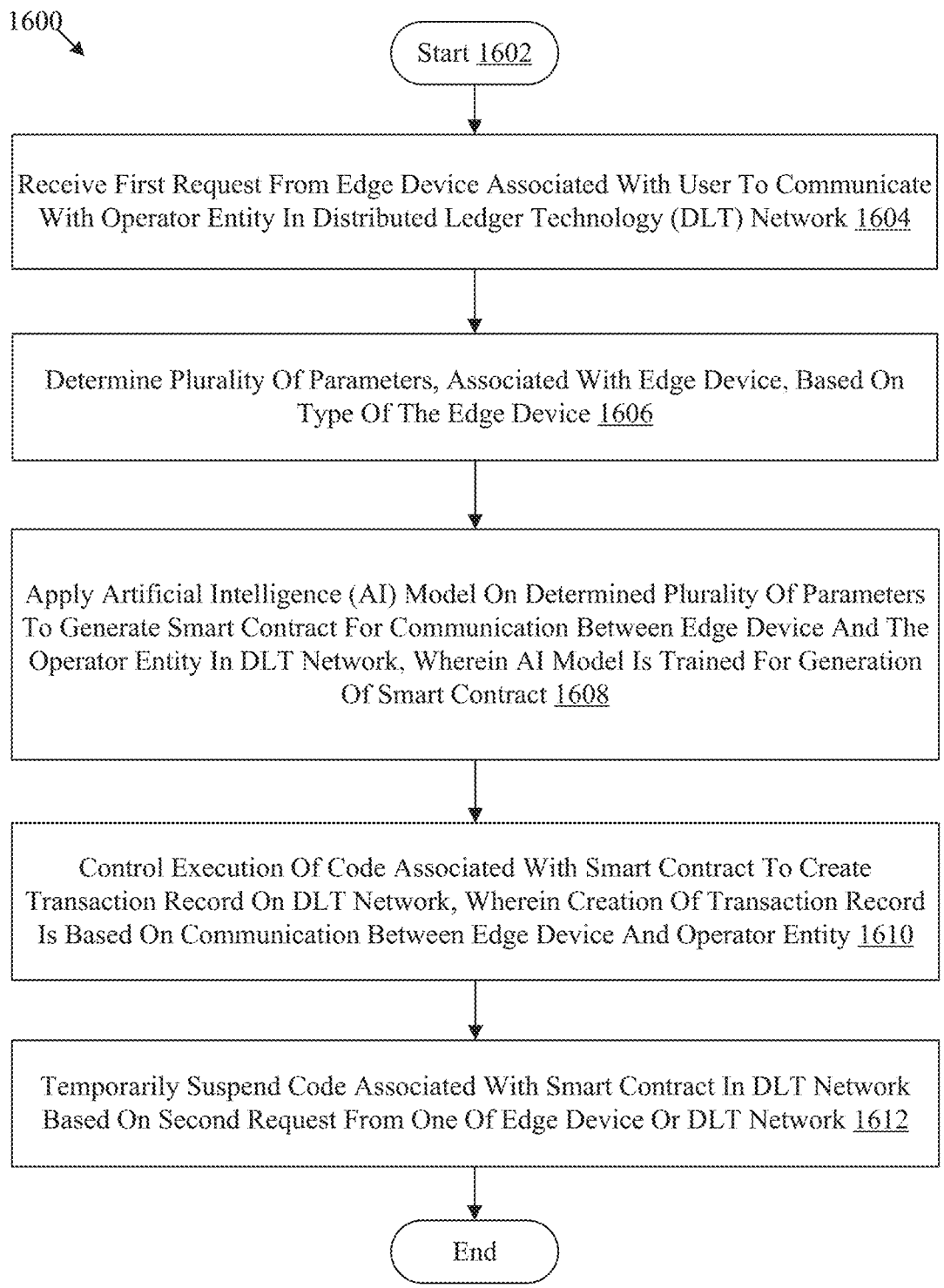
FIG. 16 illustrates an exemplary flowchart of a method for management of a DLT network using an AI model, in accordance with an embodiment of the disclosure.

FIG. 16 illustrates an exemplary flowchart of a method for management of a DLT network using an AI model, in accordance with an embodiment of the disclosure. FIG. 16 is described in conjunction with elements from FIGS. 1-4, 5A-5D, 6, 7, 8A, 8B, 9A-9G, 10A-10D, 11, 12A, 12B, and 13-15. With reference to FIG. 16, there is shown a flowchart 1600. The exemplary method of the flowchart 1600 may be executed by any computing system, for example, by the system 102 of FIG. 1. The exemplary method of the flowchart 1600 may start at 1602 and proceed to 1604.

At 1604, a first request may be received from the edge device 106 associated with the user 108 to communicate with the operator entity (such as the first operator entity 116A) in the DLT network 110. In accordance with an embodiment, the circuitry 202 may be configured to receive the first request from the edge device 106 associated with the user 108 to communicate with the operator entity in the DLT network 110.

At 1606, a plurality of parameters associated with the edge device 106 may be determined, based on the type of the edge device 106. In accordance with an embodiment, the circuitry 202 may determine the plurality of parameters associated with the edge device 106, based on the type of the edge device 106.

At 1608, the AI model 104 may be applied on the determined plurality of parameters to generate the smart contract 120 for communication between the edge device 106 and the operator entity (such as the first operator entity 116A) in the DLT network 110, wherein the AI model 104 may be trained for the generation of the smart contract 120. In accordance with an embodiment, the circuitry 202 may be configured to apply the AI model 104 on the determined plurality of parameters to generate the smart contract 120 for communication between the edge device 106 and the operator entity in the DLT network 110.

At 1610, the execution of the code associated with the smart contract 120 may be controlled to create the transaction record on the DLT network 110, wherein the creation of the transaction record may be based on the communication between the edge device 106 and the operator entity (such as the first operator entity 116A). In accordance with an embodiment, the circuitry 202 may control the execution of the code associated with the smart contract 120 to create the transaction record on the DLT network 110. The creation of the transaction record may be based on the communication between the edge device 106 and the operator entity (such as the first operator entity 116A).

At 1612, the code associated with the smart contract 120 may be temporarily suspended in the DLT network 110 based on a second request from one of the edge device or the DLT network 110. In accordance with an embodiment, the circuitry 202 may temporarily suspend the code associated with the smart contract 120 in the DLT network 110 based on the second request from one of the edge device or the DLT network 110. Control may pass to end.

Although the flowchart 1600 is illustrated as discrete operations, such as 1604, 1606, 1608, 1610 and 1612, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions or instructions executable by a machine and/or a computer (for a system, such as the system 102). The instructions may cause the machine and/or computer to perform operations that may include reception of a first request from an edge device (such as the edge device 106) associated with a user (such as the user 108) to communicate with an operator entity (such as the first operator entity 116A) in a distributed ledger technology (DLT) network (such as the DLT network 110). The operations may further include determination of a plurality of parameters, associated with the edge device 106, based on a type of the edge device 106. The operations may further include application of an artificial intelligence (AI) model (such as the AI model 104) on the determined plurality of parameters to generate a smart contract (such as the smart contract 120) for communication between the edge device 106 and the operator entity (such as the first operator entity 116A) in the DLT network 110. The AI model 104 may be trained for the generation of the smart contract 120. The operations may further include control of execution of a code associated with the smart contract 120 to create a transaction record on the DLT network 110. The creation of the transaction record may be based on the communication between the edge device 106 and the operator entity. The operations may further include temporary suspension of the code associated with the smart contract 120 in the DLT network 110 based on a second request from one of the edge device 106 or the DLT network 110.

Exemplary aspects of the disclosure may include a system (such as the system 102). The system 102 may include circuitry (such as the circuitry 202). The circuitry 202 may be configured to receive a first request from an edge device (such as the edge device 106) associated with a user (such as the user 108) to communicate with an operator entity (such as the first operator entity 116A) in a distributed ledger technology (DLT) network (such as the DLT network 110). The circuitry 202 may be further configured to determine a plurality of parameters, associated with the edge device 106, based on a type of the edge device 106. The circuitry 202 may be further configured to apply an artificial intelligence (AI) model (such as the AI model 104) on the determined plurality of parameters to generate a smart contract (such as the smart contract 120) for communication between the edge device 106 and the operator entity (such as the first operator entity 116A) in the DLT network 110. The AI model 104 may be trained for the generation of the smart contract 120. The circuitry 202 may be further configured to control execution of a code associated with the smart contract 120 to create a transaction record on the DLT network 110. The creation of the transaction record may be based on the communication between the edge device 106 and the operator entity. The circuitry 202 may be further configured to temporarily suspend the code associated with the smart contract 120 in the DLT network 110 based on a second request from one of the edge device 106 or the DLT network 110.

In accordance with an embodiment, the smart contract may be at least one of a non-fungible token (NFT) enabled smart contract, a fungible token enabled smart contract, or a non-NFT based normal smart contract based on the requirements of the user, the operator entity, or the system.

In accordance with an embodiment, the operator entity may be one of an operator device associated with a Mobility as a Service (MaaS) system, an operator device associated with a medical facility, or an operator device associated with a consumer retail establishment. The edge device 106 may be an Internet-of-Things (IoT) device. The DLT network 110 may be one of a permissionless DLT network, a permissioned DLT network, or a hybrid DLT network.

In accordance with an embodiment, the plurality of parameters may include at least one of sensor data associated with the edge device 106, user-specific data associated with the user 108, data associated with specifications of the edge device 106, or data related to a type of the DLT network 110.

In accordance with an embodiment, the circuitry 202 may be further configured to receive a set of parameters of the plurality of parameters from the edge device 106. The circuitry 202 may generate a device code associated with the edge device 106 based on the application of the AI model 104 on the received set of parameters. The circuitry 202 may generate the smart contract 120 based on the generated device code.

In accordance with an embodiment, the circuitry 202 may be further configured to output, by the AI model 104, one or more suggestions for selection of a type of the DLT network 110 for the generation of the smart contract 120. The circuitry 202 may receive, based on the one or more suggestions, a selection of the type of the DLT network 110 for the generation of the smart contract 120.

In accordance with an embodiment, the circuitry 202 may be further configured to receive the second request for suspension of the smart contract 120 in the DLT network 110 from the edge device 106. The second request may be received based on deactivation of a functionality of the edge device 106. The circuitry 202 may perform, in response to the second request, a first set of operations to initiate a silo mode for the edge device 106 based on a type of the DLT network 110. The silo mode may correspond to the suspension of the communication with the DLT network 110.

In accordance with an embodiment, the first set of operations may include deactivation of the code (for example, the chaincode) associated with the smart contract 120, and pausing of the smart contract 120 applicable for the communication between the edge device 106 and the operator entity for a first time period.

In accordance with an embodiment, the circuitry 202 may be further configured to receive the second request for suspension of the smart contract 120 in the DLT network 110 from the DLT network 110. The second request may be received based on usage of the DLT network 110. The circuitry 202 may perform, in response to the second request, a second set of operations based on a type of the DLT network 110 to initiate a silo mode for DLT network 110. The silo mode may correspond to the suspension of the smart contract 120 on the DLT network 110.

In accordance with an embodiment, the second set of operations may include deactivation of the code associated with the smart contract 120, and offloading of data associated with the edge device 106 and the transaction record from the DLT network 110 to a local database (such as the database 124) associated with the DLT network 110. In accordance with an embodiment, the second set of operations may include deactivation of the smart contract 120 for a second time period based on the type of the DLT network 110.

In accordance with an embodiment, the circuitry 202 may be further configured to receive a third request for resuming an operation of the smart contract 120 in the DLT network 110. The third request may be received based on a reactivation of a functionality of the edge device 106. The circuitry 202 may perform, in response to the third request, a third set of operations based on a type of the DLT network 110 to initiate a resume mode for one of the edge device 106 or the DLT network 110.

In accordance with an embodiment, the third set of operations may include restart of the communication between the edge device 106 associated with the user 108 and the operator entity in the DLT network 110, by use of an application programming interface (API).

In accordance with an embodiment, the third set of operations may include restart of the suspended code associated with the smart contract 120 on the DLT network 110 based on the type of the DLT network 110 and the transaction record, or redeployment of the code associated with the smart contract 120 on the DLT network 110 based on the determined plurality of parameters and the type of the DLT network 110.

In accordance with an embodiment, the DLT network 110 may include a plurality of DLT platforms 602 and a notary node 604. The circuitry 202 may be further configured to identify an unauthorized transaction between one or more DLT platforms of the plurality of DLT platforms 602 and the edge device 106 using the notary node 604.

In accordance with an embodiment, the system 102 may be further configured to connect with a plurality of operator entities associated with a plurality of ecosystems 114 based on user input for interoperability between different DLT networks. The plurality of operator entities may include the first operator entity 116A associated with a first (source) DLT network and a second operator entity associated with a second (target) DLT network. The system 102 may transition from the first DLT network to the second DLT network based on the connection and the interoperability of the system 102.

In accordance with an embodiment, the circuitry 202 may be further configured to detect a change in a pattern of the communication between the edge device 106 and the operator entity in the DLT network 110. The detection of the change in pattern may be based on one of a change in a location of one of the edge device 106 or the operator entity in the DLT network 110, or an unauthorized access to the DLT network 110.

In accordance with an embodiment, the circuitry 202 may be further configured to deactivate the smart contract 120, in a case where the change in the pattern is based on the change in the location of one of the edge device 106 or the operator entity. In accordance with an embodiment, the circuitry 202 may be further configured to determine the edge device 106 as a faulty edge device, in a case where the change in the pattern is based on the unauthorized access to the DLT network 110.

In accordance with an embodiment, the circuitry 202 may be further configured to train the AI model 104 for the generation of a device code and the smart contract 120 based on a training dataset 802. The training dataset 802 may include a first set of parameters that may include at least one of sensor data associated with the edge device 106, user-specific data associated with the user 108, data associated with specifications of the edge device 106, and data related to a type of the DLT network 110. The training dataset 802 may include a second set of parameters that may include the data associated with the edge device 106 and the DLT network 110. The AI model 104 may be trained on the first set of parameters to generate the device code. The AI model 104 may be trained on the second set of parameters to generate the smart contract 120.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
   circuitry configured to:
   receive a first request from an edge device associated with a user to communicate with an operator entity in a distributed ledger technology (DLT) network;
   determine a plurality of parameters, associated with the edge device, based on a type of the edge device;
   apply an artificial intelligence (AI) model on the determined plurality of parameters to generate a smart contract for communication between the edge device and the operator entity in the DLT network, wherein
   the AI model is trained on a first set of parameters of a training dataset for generation of a device code associated with the edge device and is trained on a second set of parameters of the training dataset for the generation of the smart contract,
   the first set of parameters includes sensor data associated with the edge device, and
   the second set of parameters includes data associated with the edge device and the DLT network;
   control execution of a code associated with the smart contract to create a transaction record on the DLT network, wherein the creation of the transaction record is based on the communication between the edge device and the operator entity;
   temporarily suspend the code associated with the smart contract in the DLT network based on a second request from one of the edge device or the DLT network; and
   perform, in response to the second request, a set of operations for the suspension of the smart contract on the DLT network, wherein the set of operations includes offloading of the transaction record from the DLT network to a local database associated with the DLT network.

2. The system according to claim 1, wherein
the operator entity is one of an operator device associated with a Mobility as a Service (MaaS) system, an operator device associated with a medical facility, or an operator device associated with a consumer retail establishment,
the edge device is an Internet-of-Things (IoT) device, and
the DLT network is one of a permissionless DLT network, a permissioned DLT network, or a hybrid DLT network.

3. The system according to claim 1, wherein the plurality of parameters includes at least one of the sensor data associated with the edge device, user-specific data associated with the user, data associated with specifications of the edge device, or data related to a type of the DLT network.

4. The system according to claim 1, wherein the circuitry is further configured to:
receive a set of parameters of the plurality of parameters from the edge device;
generated the device code associated with the edge device based on the application of the AI model on the received set of parameters; and
generate the smart contract based on the generated device code.

5. The system according to claim 1, wherein the circuitry is further configured to:
output, by the AI model, one or more suggestions for selection of a type of the DLT network for the generation of the smart contract; and
receive, based on the one or more suggestions, a selection of the type of the DLT network for the generation of the smart contract.

6. The system according to claim 1, wherein the circuitry is further configured to:
receive the second request for suspension of the smart contract in the DLT network from the edge device, wherein the second request is received based on deactivation of a functionality of the edge device; and
perform, in response to the second request, a first set of operations to initiate a silo mode for the edge device based on a type of the DLT network, wherein the silo mode corresponds to the suspension of the communication with the DLT network.

7. The system according to claim 6, wherein the first set of operations includes:
deactivation of the code associated with the smart contract, and
pausing of the smart contract applicable for the communication between the edge device and the operator entity for a first time period.

8. The system according to claim 1, wherein the circuitry is further configured to:
receive the second request for suspension of the smart contract in the DLT network from the DLT network, wherein the second request is received based on usage of the DLT network; and
perform, in response to the second request, the set of operations based on a type of the DLT network to initiate a silo mode for DLT network, wherein the silo mode corresponds to the suspension of the smart contract on the DLT network.

9. The system according to claim 8, wherein the set of operations further includes deactivation of the code associated with the smart contract.

10. The system according to claim 8, wherein the set of operations includes deactivation of the smart contract for a second time period based on the type of the DLT network.

11. The system according to claim 1, wherein the circuitry is further configured to:
receive a third request for resuming an operation of the smart contract in the DLT network, wherein the third request is received based on a reactivation of a functionality of the edge device; and
perform, in response to the third request, a third set of operations based on a type of the DLT network to initiate a resume mode for one of the edge device or the DLT network.

12. The system according to claim 11, wherein the third set of operations includes restart of the communication between the edge device associated with the user and the operator entity in the DLT network, by use of an application programming interface (API).

13. The system according to claim 11, wherein the third set of operations includes:
restart of the suspended code associated with the smart contract on the DLT network based on the type of the DLT network and the transaction record, or
redeployment of the code associated with the smart contract on the DLT network based on the determined plurality of parameters and the type of the DLT network.

14. The system according to claim 1, wherein
the DLT network includes a plurality of DLT platforms and a notary node, and
the circuitry is further configured to identify an unauthorized transaction between one or more DLT platforms of the plurality of DLT platforms and the edge device using the notary node.

15. The system according to claim 1, wherein the circuitry is further configured to:
connect with a plurality of operator entities associated with a plurality of ecosystems based on user input, wherein the plurality of operator entities comprises a first operator entity associated with a first DLT network and a second operator entity associated with a second DLT network; and
transition from the first DLT network to the second DLT network based on the connection.

16. The system according to claim 1, wherein
the circuitry is further configured to detect a change in a pattern of the communication between the edge device and the operator entity in the DLT network, and
the detection of the change in pattern is based on one of: a change in a location of one of the edge device or the operator entity in the DLT network, or an unauthorized access to the DLT network.

17. The system according to claim 16, wherein the circuitry is further configured to:
deactivate the smart contract, in a case where the change in the pattern is based on the change in the location of one of the edge device or the operator entity; and
determine the edge device as a faulty edge device, in a case where the change in the pattern is based on the unauthorized access to the DLT network.

18. The system according to claim 1, wherein the smart contract is at least one of a non-fungible token (NFT) enabled smart contract, a fungible token enabled smart contract, or a non-NFT based normal smart contract.

19. The system according to claim 1, wherein
the circuitry is further configured to train the AI model for the generation of the device code and the smart contract based on the training dataset, and the training dataset includes:
  the first set of parameters that further includes at least one of user-specific data associated with the user, data associated with specifications of the edge device, and data related to a type of the DLT network, and
  the second set of parameters that includes the data associated with the edge device and the DLT network.

20. A method, comprising:
receiving a first request from an edge device associated with a user to communicate with an operator entity in a distributed ledger technology (DLT) network;
determining a plurality of parameters, associated with the edge device, based on a type of the edge device;
applying an artificial intelligence (AI) model on the determined plurality of parameters to generate a smart contract for communication between the edge device and the operator entity in the DLT network, wherein the AI model is trained on a first set of parameters of a training dataset for generation of a device code associated with the edge device and is trained on a second set of parameters of the training dataset for the generation of the smart contract,
the first set of parameters includes sensor data associated with the edge device, and
the second set of parameters includes data associated with the edge device and the DLT network;
controlling execution of a code associated with the smart contract to create a transaction record on the DLT network, wherein the creation of the transaction record is based on the communication between the edge device and the operator entity;
temporarily suspending the code associated with the smart contract in the DLT network based on a second request from one of the edge device or the DLT network; and
performing, in response to the second request, a set of operations for the suspension of the smart contract on the DLT network, wherein the set of operations includes offloading of the transaction record from the DLT network to a local database associated with the DLT network.

* * * * *